(12) United States Patent
Cohen et al.

(10) Patent No.: US 8,983,894 B2
(45) Date of Patent: Mar. 17, 2015

(54) GENERATING A FILE WITH INTEGRAL DYNAMIC REPORTS FROM QUERIES TO AN EXTERNAL DATABASE

(75) Inventors: Gerald D. Cohen, New York, NY (US); Radoslav P. Kotorov, Somerset, NJ (US); Vincent Lam, Woodside, NY (US); Peter Lenahan, Tuckahoe, NY (US)

(73) Assignee: Information Builders, Inc., New York, NY (US)

( * ) Notice: Subject to any disclaimer, the term of this patent is extended or adjusted under 35 U.S.C. 154(b) by 195 days.

(21) Appl. No.: 12/760,214

(22) Filed: Apr. 14, 2010

(65) Prior Publication Data

US 2010/0211564 A1 Aug. 19, 2010

Related U.S. Application Data

(62) Division of application No. 11/743,845, filed on May 3, 2007, now abandoned.

(60) Provisional application No. 60/863,224, filed on Oct. 27, 2006.

(51) Int. Cl.
*G06F 17/30* (2006.01)

(52) U.S. Cl.
CPC .... *G06F 17/30864* (2013.01); *G06F 17/30554* (2013.01); *G06F 17/30861* (2013.01)
USPC .......................................................... 707/3

(58) Field of Classification Search
None
See application file for complete search history.

(56) References Cited

U.S. PATENT DOCUMENTS

| | | | | |
|---|---|---|---|---|
| 5,768,158 A * | 6/1998 | Adler et al. | .................... | 715/209 |
| 6,233,578 B1 * | 5/2001 | Machihara et al. | ................... | 1/1 |
| 6,613,098 B1 * | 9/2003 | Sorge et al. | .................... | 715/234 |
| 7,233,951 B1 * | 6/2007 | Gainer et al. | ......................... | 1/1 |
| 7,296,219 B1 * | 11/2007 | Guttman et al. | ............... | 715/219 |
| 7,478,142 B1 * | 1/2009 | Veditz | ............................ | 709/218 |
| 7,640,264 B1 * | 12/2009 | Chaulk et al. | .......................... | 1/1 |
| 2002/0073076 A1 * | 6/2002 | Xu et al. | ............................ | 707/3 |
| 2002/0129054 A1 * | 9/2002 | Ferguson et al. | .............. | 707/503 |
| 2002/0133488 A1 * | 9/2002 | Bellis et al. | ......................... | 707/6 |
| 2002/0169799 A1 * | 11/2002 | Voshell | ............................ | 707/503 |
| 2003/0226105 A1 * | 12/2003 | Waldau | ............................ | 715/503 |
| 2004/0237045 A1 * | 11/2004 | Meltzer | ............................ | 715/530 |
| 2005/0125377 A1 * | 6/2005 | Kotler et al. | ........................ | 707/1 |

(Continued)

OTHER PUBLICATIONS

"Excel Screenshots"—screenshots taken from Microsoft Excel 2003, operated on Examiner's computer.*

(Continued)

*Primary Examiner* — Daniel Kinsaul
(74) *Attorney, Agent, or Firm* — Levine Mandelbaum PLLC

(57) ABSTRACT

Records in databases or unstructured files are enriched with metadata and are indexed for retrieval by a search engine. In response to a search request, a graphical user interface (GUI) control based on the metadata associated with the search hits is constructed and displayed with the search results in a standard view. Selection of a metadata value via the GUI control filters the previously matched records down to those matching the value selected via the GUI control. The metadata in the search results is arranged in a tabular view which is embedded in the display of search results and rendered invisible until selected by the user. Reports can be constructed from an identifier each returned record set for presenting, analyzing and modifying the data, and for generating further reports.

9 Claims, 15 Drawing Sheets

(56) References Cited

U.S. PATENT DOCUMENTS

| | | | |
|---|---|---|---|
| 2005/0267868 A1* | 12/2005 | Liebl et al. | 707/2 |
| 2005/0268215 A1* | 12/2005 | Battagin et al. | 715/503 |
| 2006/0024653 A1* | 2/2006 | Battagin et al. | 434/350 |
| 2006/0106844 A1* | 5/2006 | Naick et al. | 707/101 |
| 2007/0233811 A1* | 10/2007 | Rochelle et al. | 709/219 |
| 2007/0250764 A1* | 10/2007 | Jiang | 715/503 |
| 2009/0094514 A1* | 4/2009 | Dargahi et al. | 715/255 |

OTHER PUBLICATIONS

"DigDB.com"—webpage retreived from the Internet Web Archive for Nov. 2004, regarding a plugin for Excel Roll-up capability. Available at: http://web.archive.org/web/20041109070050/http://www.digdb.com/excel_add_ins/roll_up_pivot_table_subtotal Last visited: Oct. 19, 2010.*

"All FAQs for SpreadsheetConverter—previously known as ExcelEverywhere," by SpreadsheetConverter. Available at: http://www.spreadsheetconverter.com/faq/faq-complete.htm InternetArchive link for Nov. 26, 2005: http://web.archive.org/web/20051126152150/http://www.spreadsheetconverter.com/faq/faq-complete.htm.*

"JavaScript How to," by w3schools.com Available at: http://www.w3schools.com/js/js_howto.asp InternetArchive link for Jan. 1, 2005: http://web.archive.org/web/20050101040303/http://www.w3schools.com/js/js_howto.asp.*

* cited by examiner

FIG. 5

Search baseball | Retail ▼ | Search
Search: ⦿ public content ○ public and secure content 10 of 10 records (100%). Page 1 of 1

Results 1 - 10 of about 10 for baseball. Search took 0.04 seconds.
Search Results View / Sort by date / Sort by relevance

| Department ▼ | Category ▼ | Sports ▼ | Gender ▼ | Brand ▼ | Style ▼ | Color ▼ | Price Range ▼ | Promotion ▼ | Price ▼ |
|---|---|---|---|---|---|---|---|---|---|
| Footwear | Shoes | Baseball | Mens | Mizuno | Mid-cut | Red | $75.00 - $99.99 | Regular Price | $94.99 |
| Footwear | Shoes | Baseball | Mens | Mizuno | Mid-cut | Black | $75.00 - $99.99 | Regular Price | $89.99 |
| Footwear | Shoes | Baseball | Mens | Under Armour | Low-cut | Blue | $75.00 - $99.99 | Regular Price | $94.99 |
| Footwear | Shoes | Baseball | Mens | Adidas | Low-cut | Black | $50.01 - $74.99 | Regular Price | $54.99 |
| Footwear | Shoes | Baseball | Mens | Reebok | Low-cut | Blue | $75.00 - $99.99 | 50% Discount | $94.99 |
| Footwear | Shoes | Baseball | Mens | 3N2 | High-top | Red | $75.00 - $99.99 | Regular Price | $84.99 |
| Footwear | Shoes | Baseball | Mens | Adidas | Mid-cut | White | $30.01 - $50.00 | Regular Price | $49.99 |
| Footwear | Shoes | Baseball | Mens | 3N2 | High-top | Black | $75.00 - $99.99 | Regular Price | $84.99 |
| Footwear | Shoes | Baseball | Mens | Reebok | Low-cut | White | $30.01 - $50.00 | Regular Price | $39.97 |
| Footwear | Shoes | Baseball | Mens | Nike | Mid-cut | Black | $30.01 - $50.00 | Regular Price | $49.99 |

FIG. 6

Search 10 of 10 records (100%), Page 1 of 1

| Department ▼ | Category ▼ | Sports ▼ | Gender ▼ | Brand ▼ | Style ▼ | Color ▼ | Price Range ▼ | Promotion ▼ | Price ▼ |
|---|---|---|---|---|---|---|---|---|---|
| Footwear | Shoes | Baseball | Mens | Mizuno | Mid-cut | Red | $75.00 - $99.99 | Regular Price | $94.99 |
| Footwear | Shoes | Baseball | Mens | Mizuno | Mid-cut | Black | $75.00 - $99.99 | Regular Price | $89.99 |
| Footwear | Shoes | Baseball | Mens | Under Armour | Low-cut | Blue | $75.00 - $99.99 | Regular Price | $94.99 |
| Footwear | Shoes | Baseball | Mens | Adidas | Low-cut | Black | $50.01 - $74.99 | Regular Price | $54.99 |
| Footwear | Shoes | Baseball | Mens | Reebok | Low-cut | Blue | $75.00 - $99.99 | 50% Discount | $94.99 |
| Footwear | Shoes | Baseball | Mens | 3N2 | High-top | Red | $75.00 - $99.99 | Regular Price | $84.99 |
| Footwear | Shoes | Baseball | Mens | Adidas | Mid-cut | White | $30.01 - $50.00 | Regular Price | $49.99 |
| Footwear | Shoes | Baseball | Mens | 3N2 | High-top | Black | $75.00 - $99.99 | Regular Price | $94.99 |
| Footwear | Shoes | Baseball | Mens | Reebok | Low-cut | White | $30.01 - $50.00 | Regular Price | $39.97 |
| Footwear | Shoes | Baseball | Mens | Nike | Mid-cut | Black | $30.01 - $50.00 | Regular Price | $49.99 |

Sort Ascending
Sort Descending
▲ ▲ ▲ ▲ ▲
Filter
Calculate
Chart
Rollup
Pivot (Cross Tab)
Visualize
▲
Hide Columns
Unhide Columns
Freeze Column
Unfreeze All
▲
Show Records
Send as E-mail
Save Changes
Export
Window
Restore Original
▲ ▲ baseball | Retail ▼ | Search | Search Within Results
Search: ⊙ public content ○ public and secure content

GENERATING A FILE WITH INTEGRAL DYNAMIC REPORTS FROM QUERIES TO AN EXTERNAL DATABASE

This is a divisional of U.S. patent application Ser. No. 11/743,845 filed May 3, 2007.

BACKGROUND OF THE INVENTION

The present invention provides a method for searching an index of structured and unstructured incoming data received from remote locations on a wide area network or global network, e.g. the Internet or an enterprise intranet. More specifically, the invention provides for capturing and enriching data records with metadata or appended data, and accessing the data through the use of a search engine designed for searching unstructured or free-form data.

Such search engines are in common use. Examples presented herein have been specifically tested for use with the familiar Google® search appliance and Internet search engine. However, the teachings herein are adaptable for use with other search appliances and engines useful in searching records on the Internet and on private intranets, often configured by business enterprises to enable access to data from diverse locations, e.g., the open source Lucene search engine licensed by the Apache Software Foundation.

Referring to FIG. 1 of the drawings, Internet search engines, such as Google®'s, typically index information that is 'unstructured'. Each record has information of a different type than the next record. Such search engines can also index the fields in structured databases but treat the data similar to unstructured text.

To conduct a search users type a word or a set of keywords and then submit their natural language query to the search engine. The search engine returns a set of results, known as "hits", each of which contains:

- a uniform resource locator (URL) for the source document which can be either unstructured data (text or word processor document) or structured data (database record);
- a snippet—the description of the search result, and a link, for example, to the cached source in the index.

Some search engines return all records found in a search of an index, but others, e.g., Google®, generally return only a subset of the most relevant results (URLS)—usually up to 1000 hits. For example, even though a search query may have one million hits, the engine will return only the first 1000 most relevant search results. If a user needs additional results, i.e., if the user was not able to find what was sought within the first 1000 results, the user would have to refine the search words by adding or replacing words and submit them as a new query. This limitation is pragmatic since the expectation is that if a user does not find the results within the top most relevant hits, it will be more efficient to refine the query than to page through all one million hits.

Search engines typically display approximately 10 search results per page. Usability studies indicate that the majority of the users, especially enterprise users, expect to find what they are looking for within the first 3 pages (30 search results). If they do not find it, they resubmit the query. This process is inefficient, because:

The user has no other way to gain insight about what may be in the search results except by reading the snippets of all of the results. Snippets are generated by algorithms. Sometimes they are not understandable. Such snippets can also be misleading.

There is no guarantee that replacing the old results with new results will be more useful given that the user refines the search without much knowledge about the structure content of all 1000 previous results.

Unlike unstructured information, structured information has the property that the information is all of the same type, and the components of the information can be identified by tags or field names. The information that is structured may be intended for storage in relational databases for example. For each data element that is described by a 'fieldname', there is a 'fieldvalue'.

Structured databases contain uniformly structured records, each of which has the same named categories of information, referred to as fields, and one or more values for each field in the records. That is, records are each composed of fieldname-value pairs, sometimes herein referred to as tag-value pairs, name-value pairs, or FIELD_Name, Field_Value pairs, such as those shown in Table 1 below.

TABLE 1

| Fieldname | Value |
|---|---|
| ACCIDENTDATE | 090106 |
| TYPE_OF_ACCIDENT | auto crash |
| COUNTY | HUDSON |
| INJURED | 1 |
| NAME_OF_INJURED01 | JOHN SMITH |
| HOSPITAL | Hackensack General |
| ADMITTING_DOCTOR | ROBERT JONES |

Users of a search engine find information by entering a search term. This is usually on one or more data values. For example, if a user enters the search information as "Smith", among the "hits" (search engine answer set) would be the sample record shown in Table 1 above.

However, the sample record of Table 1 would be included in the hits no matter which field had the value "Smith". That is, "Smith" could be the value of the field ADMITTING_DOCTOR, or of the field NAMEOF_INJURED, or of the field COUNTY. Hence a search for hospital records with a patient's name of "Smith" would find records where the patient's name was "Jones" if the doctor's name was "Smith". Or a search for hospital records with a patient's name of "Smith" would find records where the patient's name was "Adams" if the patient was in an automobile accident in Smith County.

Even though the number of records having information of interest to a searcher might be very small, the number of hits could occupy many pages, most containing irrelevant information, making it very difficult for the searcher to find what was wanted. Some filtering may, therefore, be appropriate.

Search results are usually displayed in a static form, giving users almost no ability to analyze or perform any manipulation of the returned results within the search results page. At most, users can sort the results by relevance or by date, and they can do this only when they are connected to the server. If they are offline, they loose even the ability to sort by relevance or date, hence storing search results has little usefulness. These limitations severely constrain the ability of users to efficiently analyze and manipulate search results to make faster and more informed decisions.

While this limitation may not be as obvious when searching completely unstructured data, such as word processing documents, it becomes quickly apparent when users search structured data sources.

An example of such application would be the search of retail or inventory databases. In both cases the search engine may return hundreds of records within different categories and different price ranges. A mere sequential listing of these records is not very useful. A tabular view would be more appropriate.

Users want to manipulate tabular data as well as transform it in order to make informed decisions. A dynamic tabular view offers the user the ability to sort the data by any of the available categories, such as gender, product category, sub-category, price range, price, color, etc.

In a dynamic table a user can quickly find not only the minimum price, but also the minimum price within each category. A user can also pivot the data, i.e., display product prices by brand and category in order to compare and contrast. An inventory manager can sum the quantities directly in the search results, instead of having to go to other applications to perform this task. The prior art offers no search tool having analytic capabilities and a facility for data transformation within the search results. Prior art search systems fail to make analysis, manipulation and storing of search results meaningful.

SUMMARY OF THE INVENTION

The present invention overcomes the aforementioned problems of prior art search engines in providing a method for zeroing in on the hits returned by a search that are most relevant to the user. The method of the invention winnows down the number of hits returned by a search request thereby enabling the user to find only the one or more relevant items from a potentially much larger list of search results obtained from an inquiry to a search engine.

In order to structure the data of interest for being able to isolate the records of information containing subsets of that data, the data of interest is indexed by embedding tags corresponding to field names in association with each value for the field name. Thus, at least some items in the result list will have embedded tags that were placed there during the indexing process.

As part of the indexing process, and prior to the indexing itself, a database record or a transaction that is being entered in the database is enriched with metadata. The metadata comes from the database as FIELD_Name, Field_Value pair. The "Field Name" is the name of the database field, and the "Field_Value" is the corresponding value for the particular record being passed through the process flow.

For example, a particular employee expense transaction having unique ID=10 can be passed through the process flow and enriched with Department information that is retrieved from the field DEPARTMENT and the field value corresponds to the department to which the employee belongs, e.g., MARKETING.

The Field/Value pair is passed and encoded in the search results URL. Any number of Field/Value pairs can be passed and encoded in the URL. Field descriptions can also be passed if the field names are not self-explanatory.

The metadata encoded in the URLs is used to build a graphical user interface (GUI) control, e.g., a navigation tree, for the search results. Although the navigation tree has been found to have the broadest application and is most widely used, other GUI controls may also be used to refine searches by searching metadata with which indexed records have been enriched. Such controls include, without limitation, accordions, calendars, e.g., for specifying dates, clocks, e.g., for specifying time, sliders, e.g. for specifying numerical ranges, and maps, e.g., for specifying geographic locations. Two or more such controls can be displayed simultaneously and each can be activated to refine the searches.

The field name or description is used to build the nodes of the tree, and the values are used to construct the leaves within each node. The tree is initially presented to the user in a collapsed form, e.g., only the nodes are visible. The user can expand the tree one node at a time. The tree can have multi-level nodes if the data is hierarchical.

When the user clicks on a value within a node, the search results, which can number 1000 or more snippets corresponding to 1000 or more respective records, are filtered by passing a further search request as a meta query, i.e., a query to search for the selected tag-value pairs in the metadata with which the records have been enriched, and only the URLs containing that value remain displayed. Hence, the user is able to narrow the search results based on data contained in the search results, without having to further refine the original search request. Using the metadata to construct a search results navigation tree allows the end user to immediately perceive the underlying structure of the search results and to leverage the knowledge of the data to refine the initial search.

Initially, a search is commenced by entering one or more words in a search engine's text box. The data in the records of the set of hits returned by the search engine are scanned for embedded tags, and the data values for each tag are itemized in a collapsible GUI control that is presented to the user. The user may then use the tree or other GUI control to refine the search by narrowing the number of hits presented, for example, by using a pointing device, such as a mouse, track ball, touch pad, pressure stick, or keystroke on a keyboard to select a specific value, e.g., by "clicking" or pressing a key. Searches initiated through the aforementioned use of the tree or other GUI control are limited to the metadata with which the records have been enriched and do not return records which contain no metadata. It is possible to search for records containing unstructured text and metadata by entering a search request in the search engine's text box using appropriate codes to indicate which of the terms are to be searched only in the metadata.

In response, the hits returned are limited to those records which include the "clicked" value in association with the tag to which the value is linked in the GUI control.

The selection of a data value within a tag results in another inquiry to the search engine where the selected value is appended to the original search term and other prior data value selections. Unless the searched database is expanded, the new search results are fewer than or equal in number to the prior number of search results and a new tree or other user interface control is created. The new GUI control lists only the tags found in the records which satisfy the previous query.

Each time a value in the GUI control is "clicked", the list of hits is narrowed and a new GUI control is presented which has tags and corresponding values limited to those found on the pages of the narrowed list of hits.

The invention further provides a method for preparing a report from a database using the original search terms and information from data values selected from a GUI control containing tags and values. When a particular search result is chosen for preparation of a report, the words or phrases that formed the original search request are matched with tags that have been provided for those words or phrases during indexing of the data to form tag-value pairs. These tag-value pairs are appended to the URL for the set of hits returned by the search engine in response to the original search request.

The modified URL, i.e., with the appended tag value pairs, is passed to a report server program for defining the subset of data which is to appear in a report having a format specified by the report preparation program. The tag-value pairs that have been appended to the URL for the set of hits returned by the search engine in response to the original search request act as filters for narrowing the original list of hits to the subset of records that have been selected by clicking the GUI control.

The method of the invention is not limited to information in a single data source. The invention provides for collecting information from multiple data sources with different tags. Multiple data sources are joined to act as a single collection and a cumulative selection GUI control having all values in the collection that are paired with embedded tags is created. When a report server program is requested the tag name in the tag-value pairs is provided with the name of the data collection.

Providing reports of the search results in dynamic tables allows a user to analyze the search results while not connected to the Internet or other network, and also allows a user to email the dynamic table to other users who can perform further analysis on the search results. In this way, the usefulness of the search results is extended beyond mere observation of the results to analysis of the results and retrieval of further relevant information.

DESCRIPTION OF THE DRAWINGS

FIG. 5 is a view of a display of a search result in accordance with the preferred embodiment of the invention.

FIG. 6 is a view of a further display of the search result shown in FIG. 5 in accordance with the preferred embodiment of the invention.

FIG. 7 is a view of a further display of the search result shown in FIG. 6 in accordance with the preferred embodiment of the invention.

FIG. 13 is a view of a display of still another search result in accordance with the preferred embodiment of the invention.

FIG. 14 is a view of a display of a modification of the search result of FIG. 13 in accordance with the preferred embodiment of the invention.

FIG. 15 is a view of a display of a modification of the search result of FIG. 14 in accordance with the preferred embodiment of the invention.

DESCRIPTION OF THE PREFERRED EMBODIMENT

Figure 1:
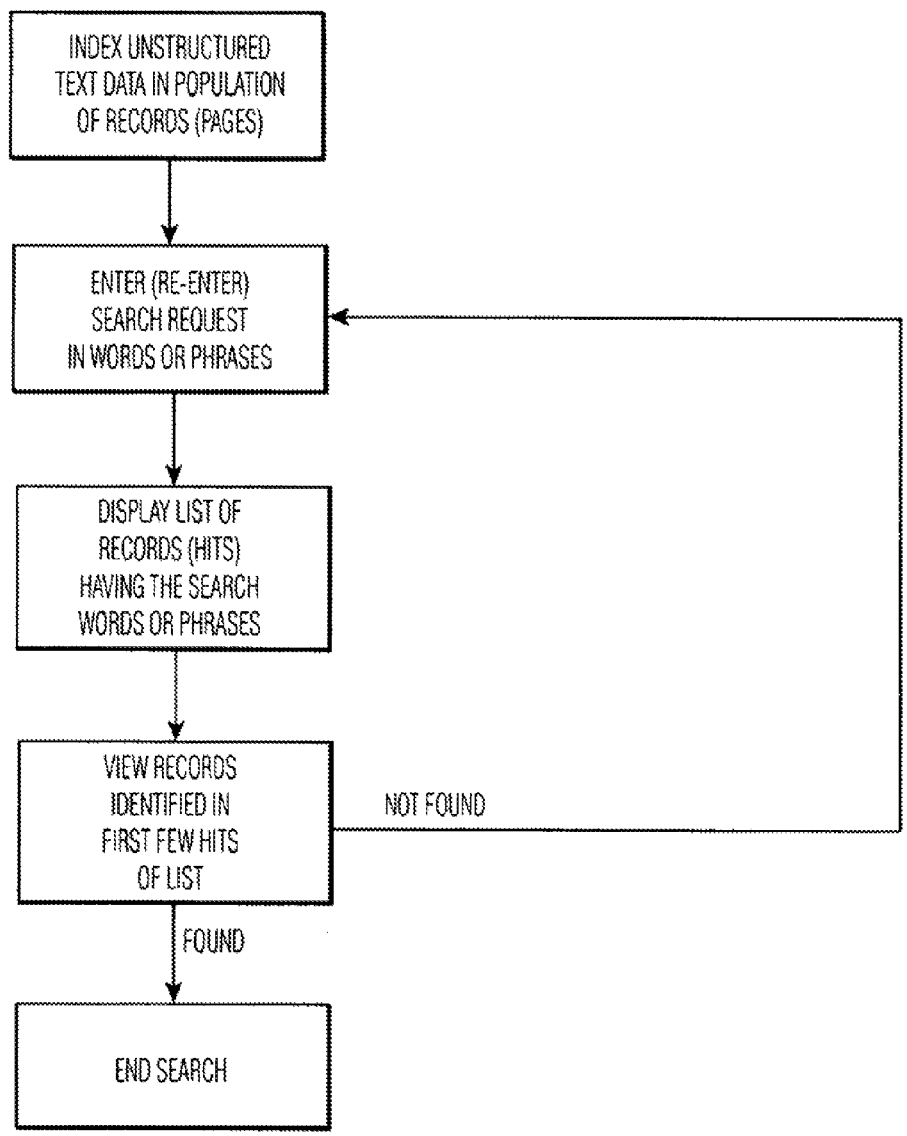
FIG. 1 is a schematic block diagram showing a prior art method of searching for records of interest in a search engine index.
Figure 2:
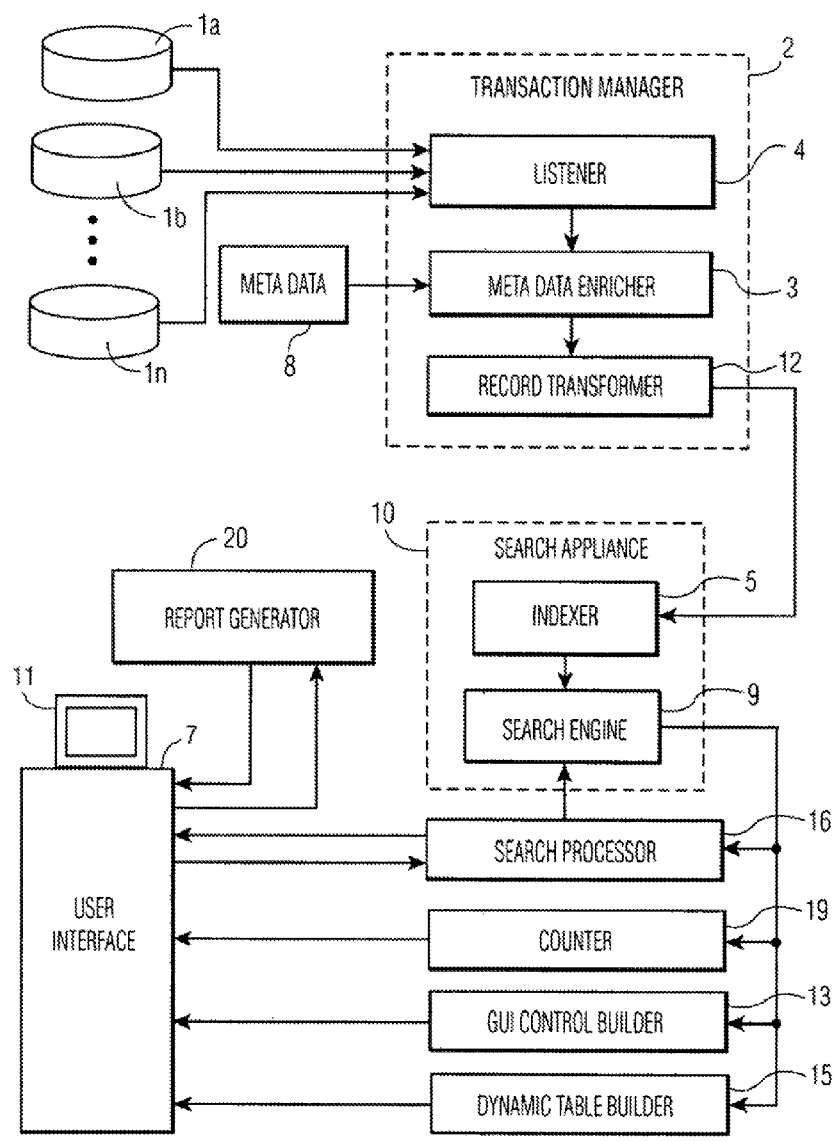
FIG. 2 is a schematic block diagram showing the apparatus of the preferred embodiment of the invention.

Referring now to FIG. 2 of the drawings there is illustrated a system for improving searches in a search engine index by enabling the number of "hits" returned by a search to be winnowed down until the number is manageable and contains the records of greatest importance to the searcher.

One or more operational data stores $1a$, $1b$ ... $1n$, each of which can be a fixed computer disc or other magnetic or optical storage medium, stores a population of records, which may be structured or unstructured, in which the searches are to be conducted.

A transaction manager 2 has a Listener 4 which "listens" to the input/output activity in the database storage component 1 to determine each event in which a new record is added to the operational data store 1 or a record existing in the data store 1 is modified. A metadata enricher component 3 receives metadata from a metadata storage component 8 which can also be a fixed computer disc or other magnetic or optical storage medium and enriches each new record with metadata including relevant tag-value pairs. That is, the text in each new record is examined for correspondence to the metadata values in the metadata storage 8. Metadata enricher 3 can be a computer having, input, output, storage, memory and display devices. Metadata enricher 3 enriches at least some, if not all, of the records in the population of records in operational data store 1 with metadata indicative of a least one field name and at least one value for a field identified by the field name.

During enrichment, the following functions may be performed. A key may be assigned to one or more fields. Field values may be transformed or replaced. Field values may be replaced with lookup values. e.g., field values which constitute abbreviations may be expanded. Field values may be calculated, e.g., to convert one type of currency to another. New fields may be appended to the metadata by joining fields from other tables in a relational database. Integration of disparate data sources or applications which do not reside in the original data source may also take place.

After each record is processed by the metadata enricher 4, it is passed to a record transformer where the records are formatted for indexing in accordance with parameters dictated by a search appliance 14 in which indexing is to take place.

A search appliance 10 has an indexer 5 which receives formatted records from the record transformer 12. Indexer 5 creates a searchable index summarizing the content of the population of records in data store 1. A search engine 9 in search appliance 14 receives search requests and searches the index for records matching criteria set forth in each search request.

When a search is to be conducted by a user, the user enters a search request into a user interface 7 in the form of a computer or terminal equipped with browser software. A search processor 16 is operatively connected to the search engine 9 and user interface 7. The search processor 16 parses and formats the search request entered by the user and then applies the search request to the search engine 9. The search engine 9 compares the text values entered by the user with the index in the search engine 9 to determine which records match the search request. Identifiers for a matching subset of records are then returned to the user interface terminal or computer 7 via the search processor 16 in the form of snippets showing the searched text in the context of excerpts from the corresponding full indexed records. A URL for the full corresponding record appears as a link with each snippet.

A GUI control construction or builder component 13 presents on a display component 11 of the interface 7, a GUI control, e.g., a tree, adapted to display the field names and values, i.e., the tag-value pairs, in the metadata with which the records identified by the returned search results have been enriched by the enricher 3.

The GUI control construction component is operatively connected to the search engine 9. Each time a user selects a field value displayed on the tree or other GUI control, the search processor generates a new search request and then applies the search request to the search engine 9. The search engine 9 then runs a new search in which a new subset of records is selected for identification from a population of records including the last subset of records Thereafter, the user display 11 presents a list of identifiers for the respective records in the new subset, and the GUI builder 13 presents, on the user display 11, a GUI control modified to display only the field names and values in the metadata of the records of the new subset. The newly displayed values on the GUI control are selectable to further cause the search engine to select a new subset of records from the population of records which now includes the last subset of records.

A counter 19 counts the number of records in the returned search results having each value with which the found records have been enriched by the metadata. The counts are displayed next to the value and field name labels on the tree or other GUI control.

A dynamic table builder or construction component 15 presents the tag-value pairs in the GUI control in tabular form. That is, the tags are shown as field names in column headers in a table and the values for each tag are lists below each field header in cells. That is, the field names are in the header row, and the tag values are in rows beneath their respective corresponding field names.

In addition to presenting the tag-value pairs in a tabular view, the dynamic table builder 15 supplements the tabular view with operational controls for operating on the data displayed in the tabular view, e.g., manipulation of the data returned by the search, display of the data, and manipulation of files containing the data. Preferably, the tabular view is hidden while the search hits are presented in a "standard view" accompanied by a GUI control, e.g., a tree of tag-value pairs.

A GUI switch control, is preferably provided for toggling between a "standard view" or "search results view" (see FIG. 7) in which the list of hits (snippets) is shown with the GUI control (e.g., tree) and the table is hidden, and "dynamic display view" in which the table is shown and the list of hits and the GUI control is hidden. The switch control appears with the words "dynamic display view" when the search results are shown in standard view, and with the words "standard view" when the search results are shown in dynamic display view. The user may simply click on the switch control to toggle the display from one view to the other.

A report generator 20 is provided for querying a structured database to obtain reports on information located in the course of the search conducted in the search appliance's index. Metadata tag-value pairs returned as the result of a search in the search engine's index are used in meta queries. That is, a relational database of structured data, separate from the records indexed by the search engine, can be queried to locate records containing fields with values corresponding to the metadata tag-value pairs with which one or more records returned by the search engine have been enriched.

Tag-value pairs used to formulate queries to the structured database may be supplemented by the user with additional search criteria. Because the structured relational database may contain records having information not included in the data store 1 and, hence, not found in the search engine's index, the number of hits returned in a search of the structured relational database may result in more hits than were generated when the same tag-value pairs were selected to winnow down the results of the search in the search engine. Accordingly it is possible to search an index of a large number of records to obtain the few most highly pertinent records, and to then obtain a report of data based on a large number of records all of which share the same high level of pertinence.

A search result storage device 17 is provided for storing a reference (e.g., URL) to each subset of records returned by each search in order to permit the user to reaccess the results of a search or display the results in a dynamic report, i.e., analogous to leaving a "bread crumb".

Figure 3:
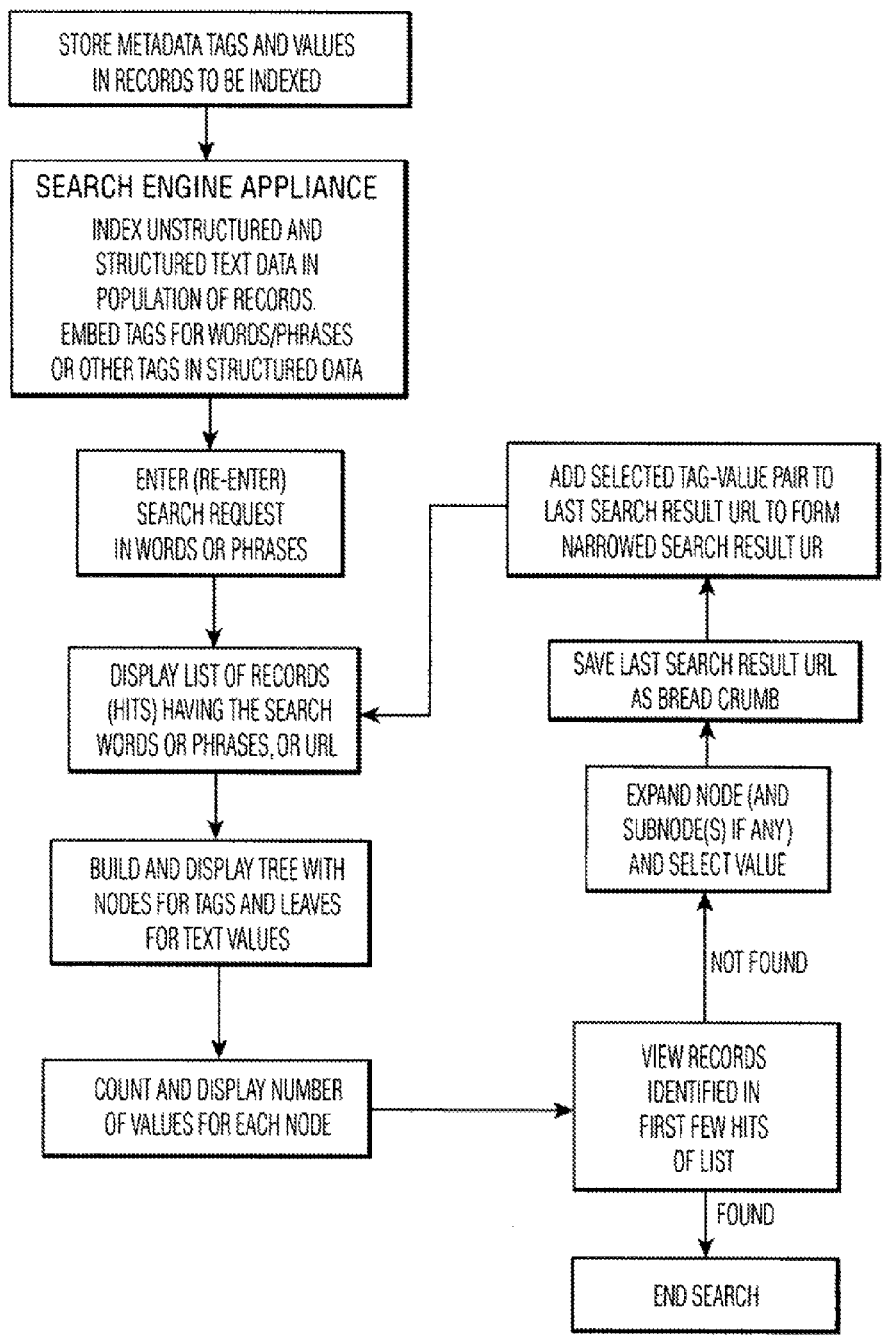
FIG. 3 is a block diagram showing a method of searching for records of interest in accordance with the preferred embodiment of the invention.

An overview of the method of the invention is illustrated in FIG. 3 of the drawings. According to the invention, all of the information presented to a search engine for indexing has a set of metadata composed of tags and values for each record that describe the type of information being indexed. Both the data and metadata are indexed. The source of the information may come from a transaction process, a database, or an application on a network. The informational transaction or record is enhanced to add any textual or other useful information to the transaction or record before it is indexed.

Before indexing a population of records for text searching by a search engine, the records are enriched with metadata containing key words or phrases which are values for tags corresponding to field names in a database. More than one level of field names or tags may be included in the metadata. A single tag for one records may have more than one value.

Hence, a field name or tag may indicate a category. Still lower level field names or tags may fall under the subfield names or tags. There is no limit to the hierarchy of field names or tags. The lowest level field names or tags are paired with one or more values. For example a tag named "building" may have a subtag named "hotel" with a value of "luxury".

The records, enriched with metadata including field name-value (tag-value) pairs is then submitted to a standard search engine, e.g., that provided by the Google® Search Appliance, or the open source Lucene search engine, for indexing in much the same way that unstructured records, files and documents not stored in a database and not enriched with metadata are indexed.

When a textual search request is entered into the search engine, the search is conducted across the entire population of records in the search engine's data source, irrespective of whether the records are enriched with tag-value pair metadata or not.

Upon completion of a search, the results of the search, in the form of snippets from the records containing text that matches the search request, are listed on successive pages. Initially, only the first page of hits is displayed. The user may select or page through subsequent pages to see all of the hits. The matched text in the records may appear in the body of the record, or in its metadata.

The tag-value pairs collectively found in the metadata of the entire search results are displayed on a GUI control, e.g., a tree, alongside the snippets corresponding to the list of hits on each page of the list of search results. Each value for a tag (field name) is listed below the tag. In the case of hierarchal metadata, each tag is listed below its parent tag, if any. The highest level tags correspond to nodes of the tree. Lower level tags correspond to branches on the tree. The values correspond to leaves of the tree. The tree remains constant as the user pages through the hits resulting from the last search. That is, as the user pages through the hits, the snippets which reflect only some of the search results change while the GUI tree which reflects the entire search results does not change unless the search engine discards hits from previously viewed pages. If previously viewed hits are discarded, the tree will be updated to reflect only the remaining hits, i.e., the hits which have not been discarded. Whether or not previously viewed hits are discarded depends on the nature of the search engine.

As the GUI control is constructed, the records having each tag-value pair are counted, and the count is displayed as a number adjacent each value and each tag.

A user can inspect the hits, i.e., the snippets, on the first page of the search results and, concurrently, view the GUI control which summarizes all of the metadata enriched records. Each tag having one or more lower level tags (sub-tags) may be selected for expanding or contracting the list of subtags and/or values under it.

Instead of sequentially reading each page of hits, the user can filter the entire search results by selecting a value on the control. Depending on the nature of the control, the user may be limited to a single value selection at a time, or may be able to select more than one value before requesting the filtered search results.

A request for filtered search results initiates a new search request for records having tags with values newly selected via the GUI control. When the search is being conducted in the index by means of the search engine, the population of records for the filtered search will normally be the same as the collection of records constituting the result of the last search. In that case, the selected tag value pairs are appended to the URL for the last search. Assuming that the tag-value pairs selected for the filtered search are not found in all of the records returned by the last search, the filtered search results will have a number of records less than the number of records in the last search.

In accordance with the invention, it is possible to generate a report by querying a database from within the search results presented to the user by actuating, e.g., clicking, a report request control. In this case, a meta query is generated from the tag-value pairs found in the search result. The meta query may be modified by the user to add, change, or remove the search criteria in the meta query before the database is queried.

The database(s) to which the query is directed may contain a population of records broader in number and/or scope than the population of records to which the original search was directed. In this case, the names of the other databases can be passed to the meta query by appending the names to the URL for the last search result. In the case of a filtered search in an expanded database, it is possible for the number of hits for which data is displayed in a report to exceed the number of hits in the index search from which the meta query was generated.

Each time a new filtered search is conducted in the index, the URL for the previous search is saved as a "bread crumb" to enable the previous search to be reexecuted without having to remember or reenter the text for the search request. The is particularly useful for requesting reports from a report generator, e.g., a report server, showing the results from the various levels of filtered searches. That is, the results of each index search that is repeated via use of the bread crumbs provide parameters which are pass to meta queries or filters for generating a report from a database.

Each time a search is run the GUI control can be utilized to further narrow or redirect the next search until a manageable number of records is returned. This provides a highly effective way of quickly obtaining a search result limited to those records having information of greatest interest to the searcher while sparing the searcher the need to peruse each record returned by the original search request.

Figure 4:
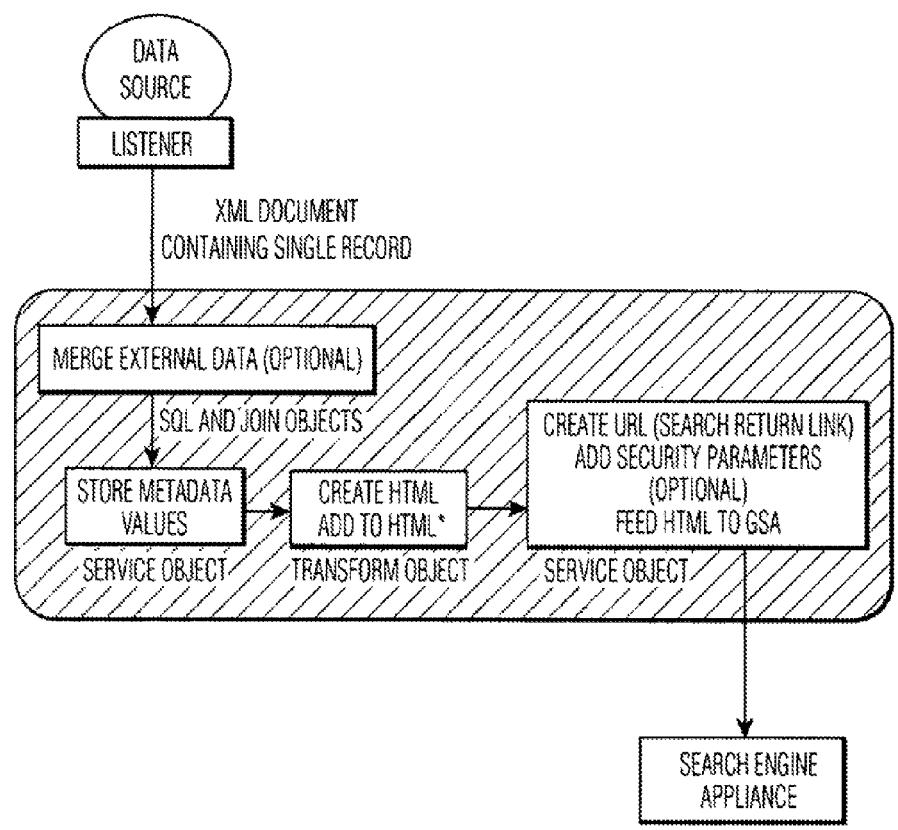
FIG. 4 is a block diagram showing, in detail, a step in the method in accordance with the preferred embodiment of the invention.

FIG. 4 of the drawings illustrates the preparation of data for indexing by a search engine appliance, e.g., one available from Google, Inc. under the registered trademark Google® or the open data source Lucene search engine. As data is added to a data source, it is monitored by a listener which produces a document containing the information in each newly detected record. Each document is preferably produced in XML format. Data pertaining to the information in each document may optionally be added to each document from other sources as may be desired.

Metadata tags and their values, relevant to the information in each document, are added to, i.e., embedded in, each document. The documents are then translated from XML to a language understood by the search engine appliance. For example, in the case of a Google® search engine, the XML documents are translated into HTML.

A URL is then created for each document. The URL includes references to the tag-value pairs.

Finally, each document is passed to the search engine appliance for indexing in much the same way that the search engine appliance indexes documents containing only unstructured data.

Example 1

An example of the preparation of data for indexing and searching in accordance with the invention follows in the context of a sporting goods business that wants to make its merchandise searchable.

First the following information is gathered.
1. An example of the XML file generated by the listener on the database from which the data will be selected.
2. The name of the database, in this case, retaildb.
3. The type of report to be called from the search result link, in this case, prddet.fex focexec, which resides in the retail application using the retaildb database.
4. Any links which are desired to appear below the main results link for calling the reports. Here there will be two links. The first will read "Product Sheet", a link which displays a PDF version of the report. For this, prddet2.fex focexec, which resides in the retail application using the retaildb database, is used. The second link will read "Summary Report", which displays a parameterized report. For this, prdsum.fex focexec, which resides in the retail application using the retaildb database, is used.

Figure 5:
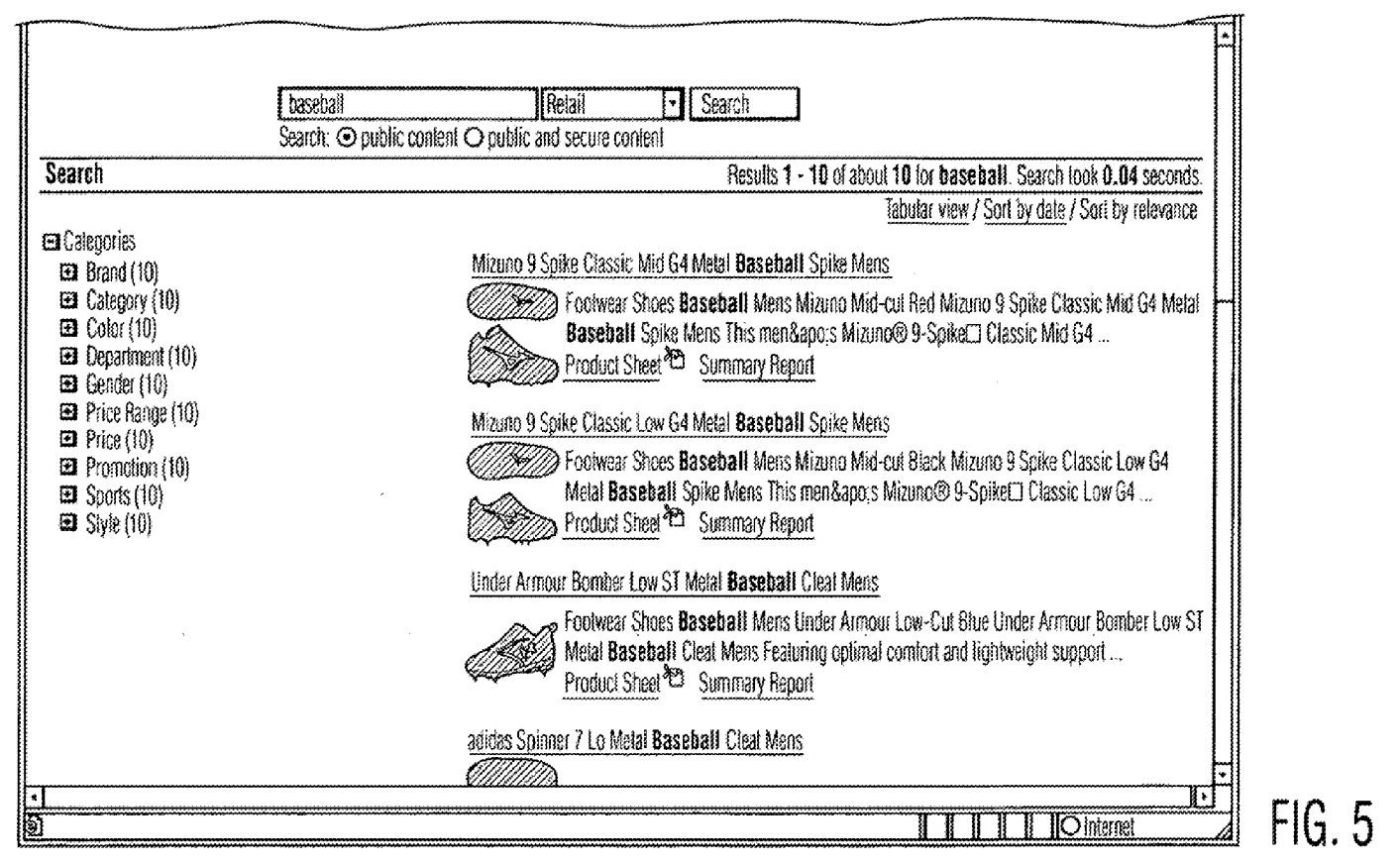

FIG. 5 shows how the search results page will look when a search against the index of the search appliance is performed on the word "baseball". The elements to be configured are items in the "Categories" tree, the search results links with an image of the related shoe, and two additional links for each search result entitled "Product Sheet" and "Summary Report". Any number of additional report links can be configured and provided with the hits returned by an index search.

The following is an XML file that has been captured by the listener. This file contains a single record about a sports shoe and is representative of the XML format the listener will create from the database structure. The data includes information about the shoe, such as, the brand, the style, the department with which it is associated, the price range into which it falls, the actual price of the shoe, a textual description of the shoe, and a reference to an image of the shoe.

```
<?xml version="1.0" encoding="ISO-8591" ?>
<RetailDB table="retaildb">
    <row>
        <retaildb.ImgURL
            type="12">
          http://vlamdemo.ibi.com:8080/ibi_apps/retail/101.gif
        </retaildb.ImgURL>
        <retaildb.Department
        type="12">Footwear</retaildb.Department>
        <retaildb.Category
        type="12">Shoes</retaildb.Category>
        <retaildb.Sports
        type="12">Baseball</retaildb.Sports>
        <retaildb.Gender type="12">Men's</retaildb.Gender>
        <retaildb.Brand type="12">Mizuno</retaildb.Brand>
        <retaildb.Style type="12">Mid-cut</retaildb.Style>
        <retaildb.Color type="12">Red</retaildb.Color>
        <retaildb.Name type="12">Mizuno 9 Spike Classic
        Mid G4 Metal
            Baseball Spike Mens</retaildb.Name>
        <retaildb.Description type="-1">This men's Mizuno®
        9-Spike?
            Classic Mid G4 baseball cleat showcases Mizuno Wave®
            which disperses impact forces, providing exceptional
            cushioning. Proflex? promotes a controlled flex for
            all three primary baseball movements: running,
            batting, and throwing,while the Spike? technology
            enhances lateral stability and traction.
        </retaildb.Description>
        <retaildb.Price type="2">94.99</retaildb.Price>
        <retaildb.PriceRange type="12">$75.00 -
        $99.99<retaildb.PriceRange>
        <retaildb.Promotion type="12">Regular
        Price</retaildb.Promotion>
        <retaildb.updated null="y" type="-6"/>
        <retaildb.productid type="4">1</retaildb.productid>
        <retaildb.ImgHTML type="12"><img src=
            "http://vlamdemo.ibi.com:8080/ibi_apps/retail/
        101.gif">
            </retaildb.ImgHTML>
    </row>
</RetailDB>
```

From this XML document, the fields to appear in the Categories tree on the search results page are identified and stored using metadata parameters. The fields in the present example are:

Brand

Category

Color

Department

Gender

Price Range

Promotion

Price

Sports

Style

These items, which are database field names, are defined using the metadata parameter FXVn, where n is the sequential number assigned for the field name being identified. In the present example, the parameters to be used are:

FXV1=Brand

FXV2=Category

FXV3=Color and so on through FXV10=Style

It is also preferable to determine which field to use as the unique identifier (key) for this record. For this example, the metadata parameter FXK is used for this identifier. The productid field is chosen as the name, i.e., FXK=productid. The key can be made up of several field names, i.e., the key can be multi-column.

The XML document is next transformed into an HTML document, which the search engine appliance (in this example the Google® search appliance) requires for its indexing. Also included in the HTML document are the parameters for the two additional results links, "Product Sheet" and "Summary Report".

The following is the transformed HTML document. It follows a specific structure required by the Google® search appliance, that is, HTML, HEAD, TITLE, META tags, and BODY Tag.

```
<?xml version="1.0" encoding="UTF-8" ?>
<HTML>
  <HEAD>
  <TITLE>Mizuno 9 Spike Classic Mid G4 Metal Baseball Spike
Mens
    </TITLE>
        <META NAME="Department" content="Footwear" />
        <META NAME="Category" content="Shoes" />
        <META NAME="Sports" content="Baseball" />
        <META NAME="Gender" content="Men's" />
        <META NAME="Brand" content="Mizuno" />
        <META NAME="FOCEXEC_FOR_TITLE" content="prddet" />
        <META NAME="FOCSOURCEDATABASE_FOR_TITLE"
content="RetailDB" />
        <META NAME="FOCEXECAPPNAME_FOR_TITLE" content="retail"
/>
        <META NAME="LINK_DISPLAY_NAME2" content="Summary
Report" />
        <META name="FOCEXEC2" content="prdsum" />    <META
NAME="FOCSOURCEDATABASE2" content="RetailDB" />
        <META NAME="FOCEXECAPPNAME2" content="retail" />
        <META NAME="Style" content="Mid-cut" />
        <META NAME="Color" content="Red" />
        <META NAME="PriceRange" content="$75.00 - $99.99" />
        <META NAME="Promotion" content="Regular Price" />
        <META NAME="LINK_DISPLAY_NAME1" content="Product Sheet"
<img src=" http://vlamdemo.ibi.com:8080/ibi_html/
javaassist images/mr/mr_ex_pdf.gif";border="
0" />
        <META NAME="FOCEXEC1" content="prddet2" />
```

```
    <META NAME="FOCSOURCEDATABASE1" content="RetailDB" />
    <META NAME="FOCEXECAPPNAME1" content="retail" />
    <META NAME="HTML_LEFT_OF_SNIPPET" content="<img
src=" http://vlamdemo.ibi.com:8080/ibi_apps/
retail 101.gif">" />
    <META name="Price" content="94.99" />
</HEAD>
<BODY>Footwear Shoes Baseball Men's Mizuno Mid-cut Red
Mizuno 9 Spike Classic Mid G4 Metal Baseball Spike Mens
This men's Mizuno® 9-Spike? Classic Mid G4 baseball cleat
showcases Mizuno Wave® which disperses impact forces,
providing exceptional cushioning. Proflex? promotes a
controlled flex for all three primary baseball movements:
running, batting, and throwing, while the 9 Spike?
technology enhances lateral stability and traction. 94.99
$75.00 -$99.99 Regular Price 1 Sporting
   </BODY>
</HTML>
```

In the HTML document of the above example record, the following items have been entered:

1. The title of the search results link (<TITLE> </TITLE>)
2. The category field values which were stored for the Categories list are entered in the META tags, using the format:

```
<META name = "Brand" content = "Mizuno" />
<Meta name = "Category" content = "Shoes" />
```

The values determined earlier for the report that is called when the search results link is clicked are put into the following format:

```
<META name = "FOCEXEC_FOR_TITLE" content = "prddet" />
<META name = "FOCSOURCEDATABASE" content = "RetailDB" />
<META name = "FOCEXECAPPNAME" content = "retail" />
```

The additional links for Product Sheet and Summary Report reside in the following Meta tags. The path to the image of the PDF icon appears in the Product Sheet tag.

```
<META name = "LINK_DISPLAY_NAME1" content = "Product Sheet"
<img src=" http://vlamdemo.ibi.com:8080/ibi_html/
javaassist images/mr/mr_ex_pdf.gif";border=" 0"
>" />
<META name="FOCEXEC1" content="prddet2" />
<META name="FOCSOURCEDATABASE1" content="RetailDB" />
<META name="FOCEXECAPPNAME1" content="retail" />
```

The following Meta tag adds the image of the shoe next to the main results link:

```
    <META    name="HTML_LEFT_OF_SNIPPET"    content=
"<img src="    http://    vlamdemo.ibicom:8080/ibiapps/
retail101.gif">"
```

The Body tag contains anything for which a user is to be able to search. For example, the only way a search for "Nike" will return this record in the result is if the word "Nike" is included in the body tag. The search may be limited to the body of each record. Alternatively, depending on the search engine, the body may be searched as text, and the metadata may be searched for tag-value pairs (with Google) or the metadata may, like the body, may be searched as text (with Lucene).

In this example, all fields have been included in this record so that all values are searchable.

Finally, it is necessary to include the category fields, chosen from the record for the Categories tree, into a feed to search appliance object. The following uses the Brand category to show the format used:

```
FXF1 = Brand, FXT1 = Brand, FXV1 = SREG(FXV1)
FXF2 = Category, FXT2 = Category, FXV2 = SREG(FXV2)
```

The FXFn parameter is the record field, and FXTn parameter is the field name.

The SREG(FXV1) is derived from the values entered in the Store Metadata Values object. The values should match those that were created in the Store Values object.

If desired, the name that appears in the Categories tree can be changed by entering another value in the FXTn parameter. For instance, in the example above, FXT1=Brand Name could be entered.

The ability to provide a tag name FXT as an alias for each field name FXF enables a merger of common values from fields in different data sources, irrespective of whether or not there is a relationship between the fields or the data sources. For example, let datasource$_1$ be a database having a table that appears as follows.

TABLE 2

Sales by Country

| Sales by Country | Dollar amount |
|---|---|
| US | $40,000,000 |

Let datasource$_2$ be a database having a table that appears as follows.

TABLE 3

Returns by Country

| Returns by Country | No. of Units |
|---|---|
| US | 20,000 |

If the tag value for each data sources is the same as the field name, i.e., FXT-FXF, a GUI control tree will list "Sales by Country" and "Returns by Country" as two separate nodes under each of which the value "U.S." will appear with a of "1" corresponding to the one record in each respective database.

By setting "Sales by Country"="Country" in datasource$_1$ and "Returns by Country"="Country" in datasource$_2$, the GUI control tree will list "Country" as a single node under which the value "U.S." will appear with a of "2" corresponding to the sum of the number of records with the value "U.S." for the tag "Country" in each of the respective databases.

At this point, the HTML document contains the parameters necessary to meet the requirements for being searched. The feed to search appliance object then sends this document on to the indexer to be indexed. Once indexed, the document is ready to be discovered in the course of a search by a user.

When a user poses a search term to a body of indexed records (documents), the results page(s) which are relevant to the search terms is displayed. For the hits that have tags, a GUI control, e.g., a tree, is also displayed to one side of the results page.

The GUI control is constructed by examining each hit and extracting its metadata tags, if any are present. When a new tag is found it is made the first level of the GUI control. The value of the tag is made the second level of the GUI control. Hence, the completed GUI control for a given search term has summarized all of the hits, including those that do not appear on the unscrolled screen, into a structure that can be examined by the user. When there are many types of structured records in the index the GUI control provides a global view of the returned search results, that is, a representation of all records from all data sources in the index.

Consider a user searching a data source populated with documents indexed as described above, that is, one containing information on athletic footwear. Assume the user initially enters "baseball" as a search term in a search engine such as the Google® search engine. The resulting display appears as shown in FIG. 5.

The search request for documents with the term "baseball" has returned 10 hits. Three snippits corresponding to three of the hits are shown on the right side of FIG. 5. A heading of a snippit for the fourth hit is shown. Scrolling down the screen will permit the user to see the remainder of the snippit for the fourth hit plus the succeeding snippits for the next six hits. Had the search returned 1000 hits, the user would have to spend much time paging and reading the snippits to determine whether the sought after information was disclosed by the search.

To the left of the snippits in the display of FIG. 5 is a GUI control, in this case a tree. The tree summarizes all of the information contained in the metadata within the 10 documents disclosed by the search.

A high level tag entitled "Categories" is presented at the top of the tree. Beneath the "Categories" tag is a list of 10 second level tags which identify the categories for which values have been entered in the metadata. Next to each tag, in parentheses, is the number of values for the each category that appear in the 10 records.

In this case, each of the 10 documents has one value for each of the ten categories. Hence, the number 10 appears in parentheses next to each category tag name. The user can now open a tag of the first level of the tree and will see all of the field values of the search result hits for that tag.

The results of the search can also be displayed in a dynamic tabular view by selecting the "tabular view" link in the display. As can be seen in FIG. 6, the metadata tag-value pairs found in the selected records, i.e., hits, can be displayed in tabular form. The tables can be provided with their own GUI controls to enable various functions to be performed on the data that appears in the records of greatest interest, i.e., the records corresponding to the hits still displayed after the search results have been sufficiently winnowed down by iteratively selecting values from the tag-value pairs on the GUI control tree. Users are, therefore, able to analyze search results, even when not connected to the Internet. They can also email a dynamic table to other users, who can further analyze the results.

The user may click on the column headed "Price" to open a floating menu with options to analyze the data in the table as shown in FIG. 7. Operations such as "sort" (ascending or descending), filter, calculate and the like can be performed on the result data illustrated in the dynamic report table shown in FIGS. 6 and 7.

Referring now to FIGS. 5 and 7, it is seen how a user can change the display of search results from standard to dynamic tabular view. A search is initiated from a Web page accessible via a URL that contains at least one text input box where a user can type one or more key words. The key words define the query parameters. The query is submitted to a search engine via a standard submit process triggered by a user "click" on a submit button on the Web page.

The search engine returns a set of results to the browser and displays them in a standard view designated (FIG. 5). Before the results are displayed, the URL for each hit is inspected, and extracted from the individual URLs are all the elements used to construct the GUI tree, and also the title of the hit. Other elements can also be included, e.g., links to the reports. In addition, an invisible tabular view of the returned a set of results is embedded in the page with still other elements.

The standard display of the search results includes: (1) a GUI tree or alternative GUI control and (2) the individual hits displayed as a snippet of each record returned by the search engine. Each hit snippet contains a title, description, links to its corresponding record or other reports, and other elements. The snippets, as displayed, are ranked by the relevancy of their records to the user query. The hits can span multiple web pages. Also embedded in the page, but not yet visible to the user are a tabular view of the set of results and links to the standard view and external reports.

After the search results have been displayed in standard view, the user has an option to switch to the embedded dynamic tabular view. The selection of dynamic tabular view is made via a button, a submit link or other standard web mechanism to submit a user request for action. The submit button can be positioned anywhere on the web page that displays the search result.

The submission by a user of a request to display the search results in a tabular view (FIG. 7) renders the GUI tree control, search result snippets and corresponding report and tabular view links on the page invisible, and makes visible, the embedded but previously invisible dynamic tabular view and the standard view or search results view link as well as other relevant functional links, e.g., "sort".

The name-value pair for each element to appear in the dynamic table is extracted from the URL for each hit. An array is then created with rows, each of which corresponds to, i.e., displays the data in, a separate hit.

The names in the name-value pairs appear as column names in the dynamic table. The values in the name-value pairs of each hit appear in cells within the same row, each value of a name-value pair being within a column headed by its name.

Table 2 below provides a logical view of the final array constructed during the transformation of the search results to a dynamic tabular view.

TABLE 2

| Hit Results Elements (i, j) | Element 1 Name | Element 2 Name | Element j Name |
|---|---|---|---|
| Result 1 | Value (1, 1) | Value (1, 2) | Value (1, j) |
| Result 2 | Value (2, 1) | Value (2, 2) | Value (2, j) |
| Result i | Value (i, 1) | Value (I, 2) | Value (I, j) |

The transformation process also allows the nesting of subarrays within the cells of the main array for more complex data structures.

The URL for each hit is essentially a long text string. In order to extract the name/value pairs required to construct the array, the tags that were created and placed in the URL when the data was prepared for indexing are programmatically identified. That is, as the program goes through the URL it recognizes strings such as Category Name=Country and Category Value=USA, and constructs the name-value pair for the array. The program ignores all other characters in the URL. Any element from the URL can be included in the array.

After the name-value tags for each of the resulting hits of a search have been extracted, they are passed, as raw data, i.e. without any formatting or other features, along with the analytic/interactive engine, in a single HTML file that is sent back to the user for display in the browser.

The analytic/interactive engine applies formatting and styling to the name-value pair data, title of the hit and other data specified by the systems architect, including links to reports, as it renders the dynamic table in the browser. The dynamic table is embedded in the original search page thus forming the dynamic tabular view. The analytic/interactive engine can apply different fonts, styles and colors to each row, column and cell in the dynamic table via configurable style sheet options which can be set by a programmer.

The dynamic tabular view includes an analytic/interactive engine and data packaged into a single HTML file that can be displayed in any browser. The interactive engine can be written in Java Script® or any similar Internet web programming language, and controls the manipulation and display of the data in the browser.

For example, users can trigger commands via a pop up menu to sort the data in the dynamic table based on any of the columns. Common use will be to sort search results by category, such as price range, for example, in commercial applications, or just price. Users can also apply calculations, visualization, create charts, roll up the data or pivot it. In other words they can manipulate the data as needed to find what is of interest. This ability is specifically useful when searching structured data sources.

Users can also use the analytic engine to save their interactions or to email the dynamic table to other users. The latter feature is particularly useful for sharing search results. For example, if an analyst finds results that may be beneficial to another analyst, both can share an analyzed/shortened list of data.

The dynamic table acts much like other software applications for data manipulation, e.g. spreadsheet or database application software. The most significant difference, however, between the dynamic table of the invention and application software is that, with the dynamic table, all program features are embedded in the user file, rather than being installed as an application on the computer. This is akin to using a spreadsheet file on a computer without having the spreadsheet application installed on the computer. The entire user interaction is conducted within the browser without any server or other external technology to process the user actions.

Example 2

Another example of the preparation of data for indexing and searching in accordance with the invention follows in the context of an enterprise that wants to make information on its employees searchable.

Metadata containing name-value pairs is added to each record as follows.

```
<HTML>
    <HEAD>
        <-- Comment : The text below defines the metadata
        that will be used to construct the navigation tree.
        "Name" stands for FIELD NAME and "Content" is the
        value retrieved from the field for each indexed
        record. Each Field/Value pair is encoded in the URL
        for the search results -->
        <TITLE>Employee Data for HENRY CHISOLM</TITLE>
        <META content="Report on Employees"
        name="description"/>
        <META content="SALES" name="dept"/>
        <META content="SALES SPECIALIST" name="title"/>
        <META content="CE" name="div"/>
        <META content="CENTRALV name="area"/>
        <META content="MA" name="destination_state"/>
    </HEAD>
        <-- Comment : The text below is indexed by the
        Google® appliance for search. This text is retrieved
        from any number of fields from the database. -->
        <BODY>360 20041228 978-465-6080 MA NEWBURYPT 13:48:28
0.5 0.02 0 188 CHISOLM HENRY CE SALES 257PRB SALES
SPECIALIST 43000.0000 1990-02-07 00:00:00.0 CENTRAL 1
        </BODY>
</HTML>
```

During the pre-indexing preparation of the records in the population to be searched, a retrieval URL is generated for each indexed record with the metadata encoded in the URL. The search results URL can appear as follows.

```
http://vlamxp.ibi.com:8080/WFServlet?FOCCAT999=
Data_Source&FOCVAL999=Employee%20Calls&FOCVAL1=
CORP&FOCCAT2=TITLE&FOCCAT1=DEPT&FOCVAL2=
MARKETING%20EXECUTIVE&SOURCE=EMPCALLS&FOCVAL3=
CORP&FOCCAT3=DIV&FOCVAL5=MA&FOCTITLE999=
Data_Source_Title&KEY=3&FOCCAT4=AREA&FOCCAT5=
DESTINATION_STATE&FOCVAL4=CORPORATE
```

Figure 8:
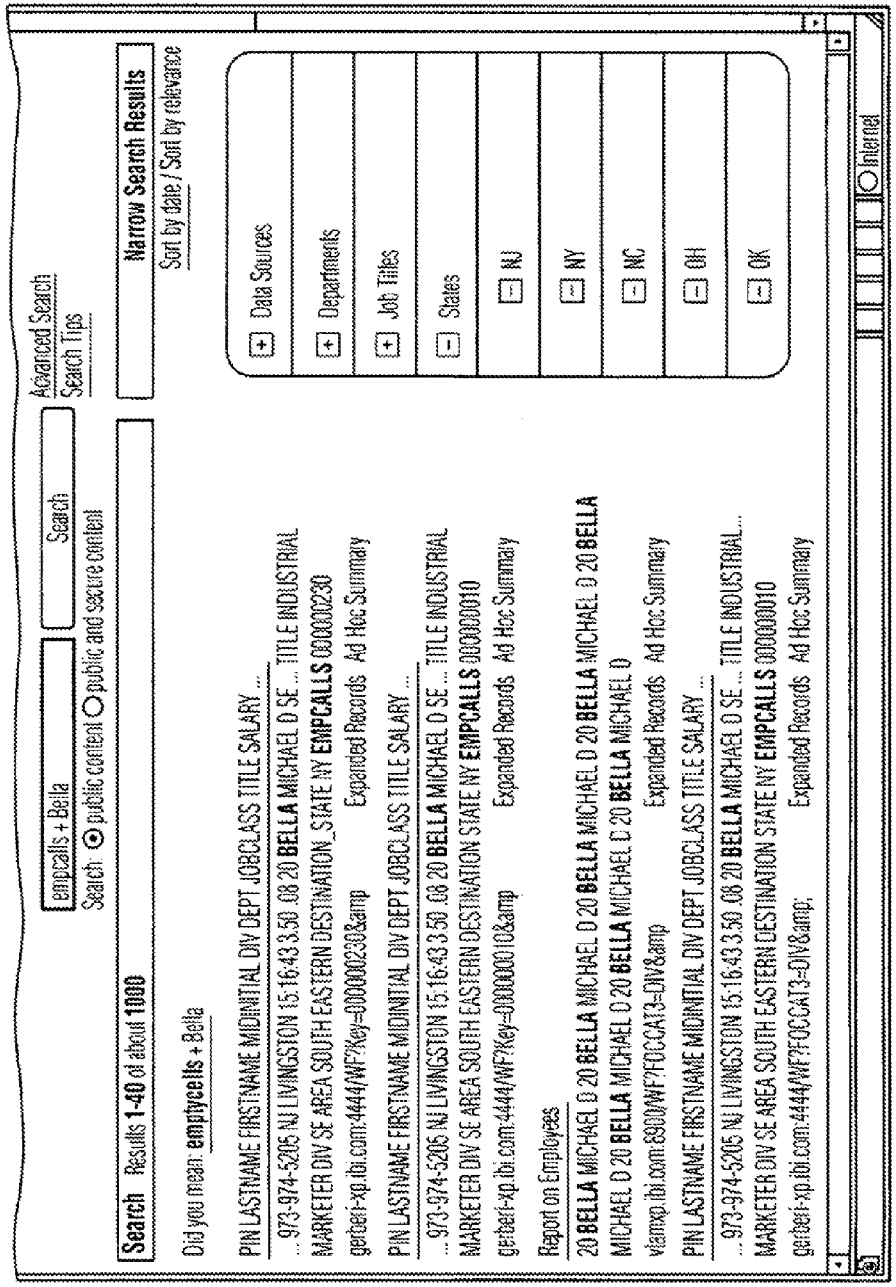
FIG. 8 is a view of a display of another search result in accordance with the preferred embodiment of the invention.

The field/value pairs are parsed in the URL as:
FOCCAT1=DEPT&FOCVAL2=MARKETING
This pair comes from the following line in the HTML message:
<META content="SALES SPECIALIST" name="title"/>
The GUI navigation tree is built from the set of all field-value pairs in the URL, using a standard program to loop through the URL string and collect the data required to build the tree. A standard GUI tree control is used to display the metadata as shown in FIG. 8.

Figure 9:
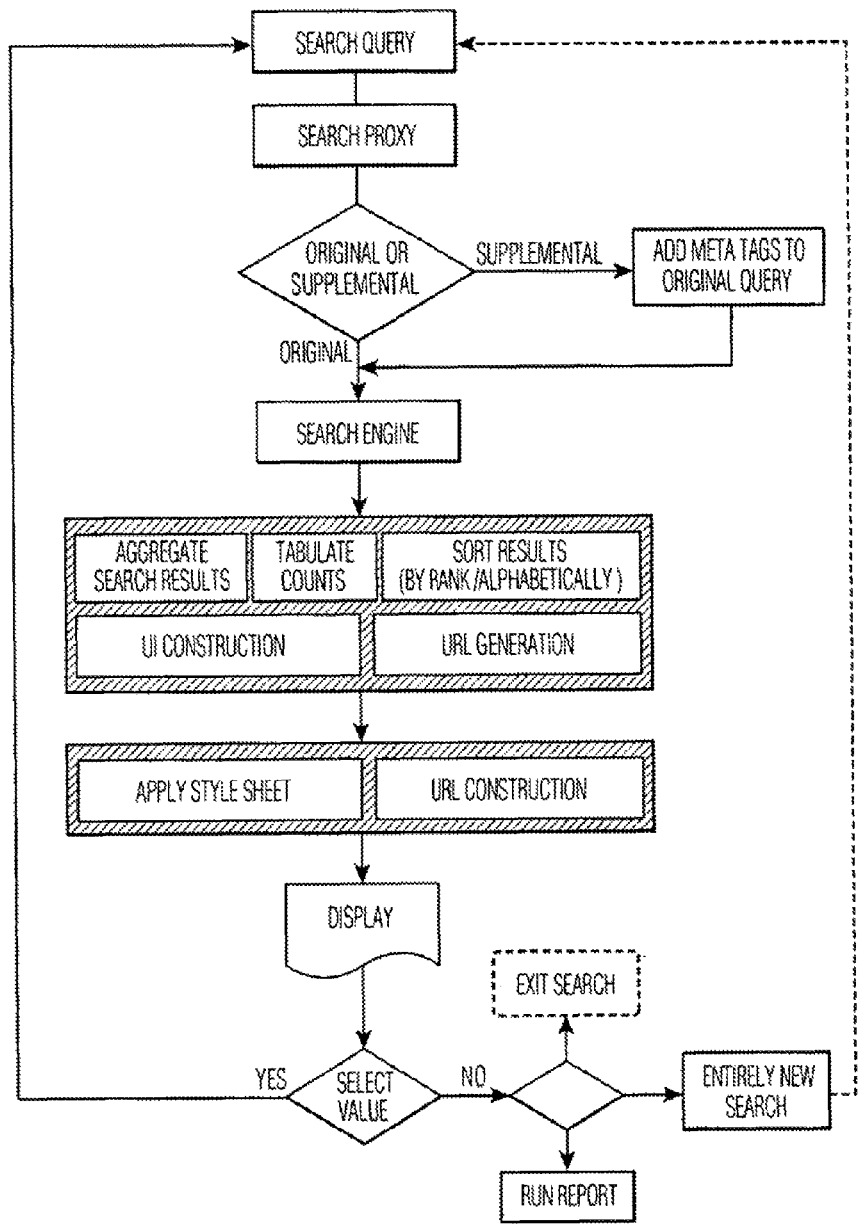
FIG. 9 is a block diagram showing, in detail, another step in the method in accordance with the preferred embodiment of the invention.

Referring now to FIG. 9 of the drawings, the process by which a user executes a search is shown. Initially, the user formulates a query in the form of one or more words or phrases or logical statements, in text form. The search query is passed, as is, to the search engine.

If the query is the first one to be executed in the course of a search, the search proxy is routed directly to the search engine. The search engine aggregates each of the records which satisfy the search query into a list of search results. A count of the tag-value pairs in the records returned by the search is tabulated. Snippets of the records which are to be displayed in the search result are ranked, e.g., by relevance, by date, or alphabetically.

A GUI control, e.g., a tree, is then constructed in accordance with the tag-value pairs found in the records returned by the search. A URL for the search result is generated at the same time.

A style sheet is applied to the results which are then displayed. preferably on a computer video monitor. The generated URL is also constructed and displayed with the search results.

Upon viewing the displayed search results the user may further refine the search by selecting a value on the GUI control in which case metadata tags corresponding to the tag-value pair of the selection are appended to the URL for the search result and resubmitted to the search engine as a new search query.

If the user does not select a value on the GUI control, he or she may request a report based on the records in the search result, may exit the search and stop, or may enter a new search that is independent of the previously conducted search. A URL is generated for each search result. A link applies the URL to the report generator in a meta query for reporting on data in a structured database as a function of the results of the search in the search appliance index.

Figure 10:
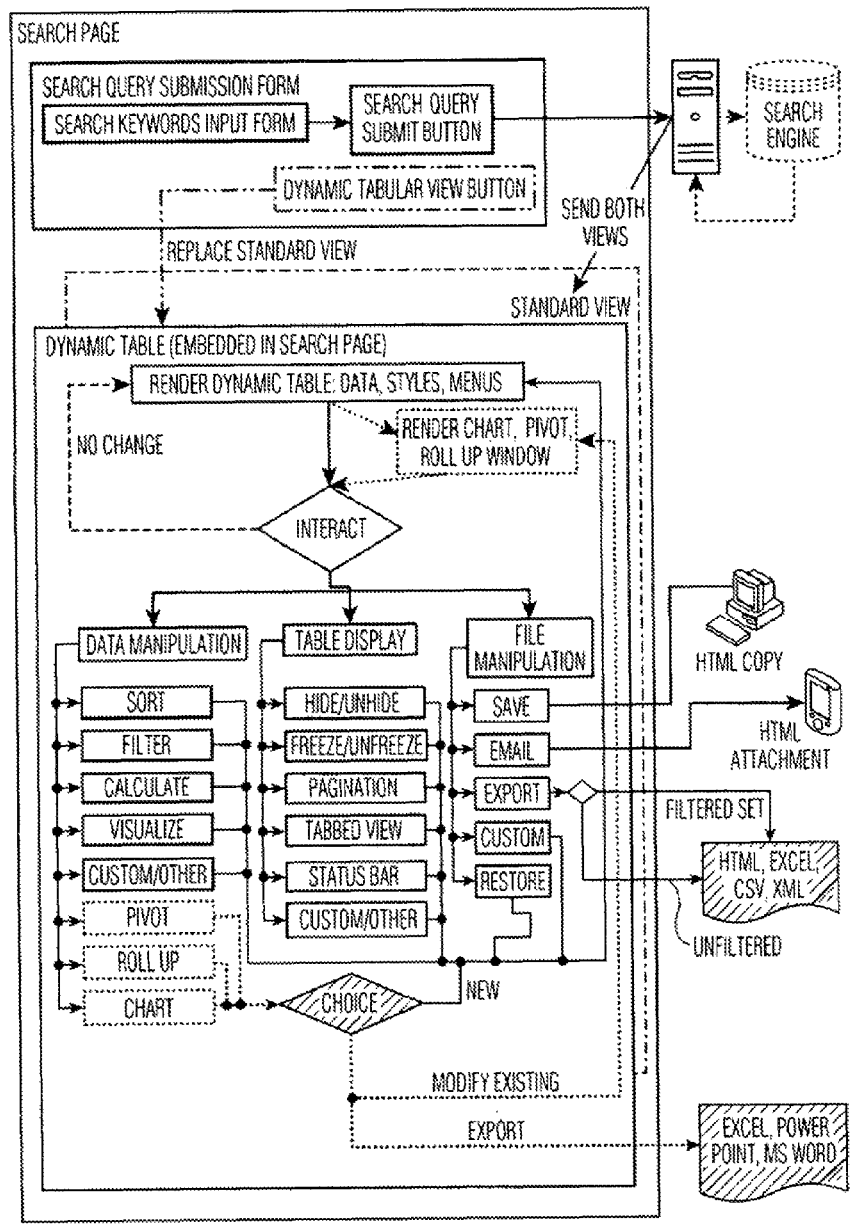
FIG. 10 is a block diagram showing, in detail, still another a step in the method in accordance with the preferred embodiment of the invention.

The process by which a user may interact with the dynamic tabular view that is embedded in a search result page is illustrated in FIG. 10. The search page presented to the user has a text input box control for entering a search request and a button control for submitting the search request to the search engine. Another button control is provided for enabling the user to display a dynamic report of the search results in the form of a dynamic table.

When the search is executed, both the conventional standard view of the search results and a dynamic tabular view are embedded in the search page. The dynamic tabular view is made visible on the search result page in response to actuation of the dynamic tabular view button by the user. The data from the tag-value pairs is displayed in the cells of the table which is formatted in accordance with style sheets which are also embedded in the search result page.

Controls are provided for manipulation of the data in the tag-value pairs returned by the search, display of the data, and manipulation of files containing the data. For example, the data may be manipulated by sorting on one or more columns of the tabular view, filtering to reduce the number of records shown to those having a particular property, calculation of values for new fields as a function of the values returned by the search, calculation of summary information, e.g., totals, averages, altering the appearance of the data in accordance with various conditions, e.g., changes in font color, size or weight, pivoting of data, and the like. Unlike the GUI controls which are actuated for sending a new query to the search engine, e.g., accordions, calendars, clocks, sliders, and maps, these controls merely hide the records returned by the search which do not satisfy the filter criteria.

Provision is also made for controls affecting the display of the table in the tabular view. Columns may be hidden. Rows may be frozen so as not to scroll with other rows. Data may be split among pages. Tabs may be provided to access pages. A status bar may be displayed to show summary information.

Further controls can be included for file manipulation. Data may be saved in a file on the user's computer, emailed for access by another computer, exported as input to an external computer program e.g., for data analysis or inclusion in a word processing document, in a format compatible with the receiving program, e.g., HTML, xls, .db, .doc.

A GUI control can cause a filter to be applied against the data in a search result table for filtering the data in the table without querying the index. A GUI control can enable the generation of query to the search result table to transform the form of the data in the search result table to that of a chart. A GUI control can enable the generation of query to the search result table to perform calculations on the data in the search result table. A GUI control can enable the generation of query to the search result table to display a ranking of the data in the search result table. A GUI control can enable the generation of query to the search result table to save the search result table or to save a modified table derived from the search result table, e.g., by use of another GUI control. A GUI control can enable the generation of query to the search result table to email the search result table or a modified table derived from the search result table. A GUI control can enable the generation of query to the search result table to export the search result table or a modified table derived from the search result table to another application.

Moreover, the data presented in the tabular view may be narrowed in a manner similar to the way the number of hits is narrowed through the use of a GUI control, i.e., by selecting tag-value pairs to send a new query to the search engine to return records having the selected tag-value pairs.

Figure 11:
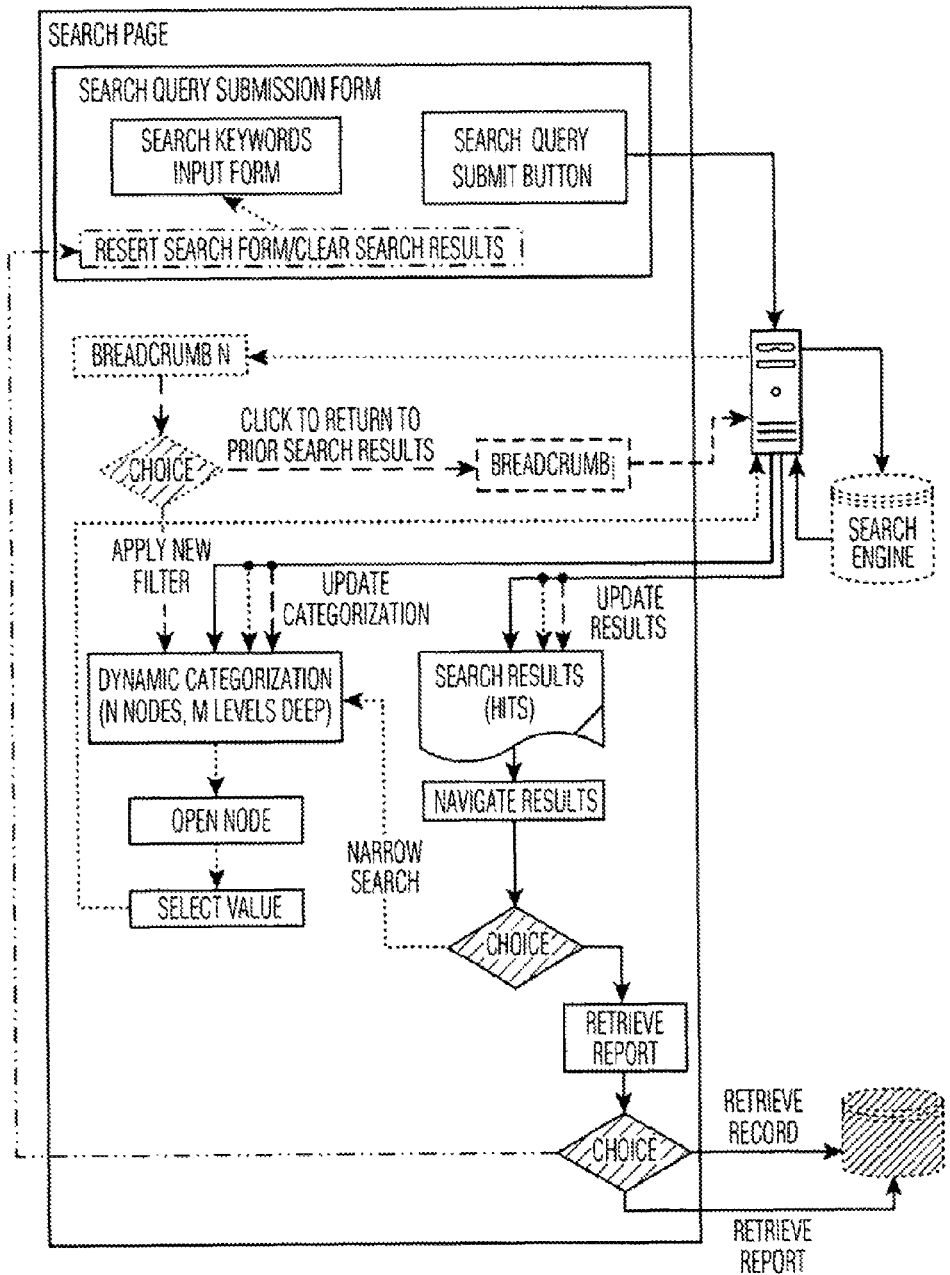
FIG. 11 is a block diagram showing, in detail, a further step in the method in accordance with the preferred embodiment of the invention.

Referring now to FIG. 11, the process of narrowing the search results displayed in a dynamic tabular view is illustrated. As in the case of a search which returns hits in standard view, that is with snippets for hits listed on successive pages and tag-value pairs selectable from a GUI control, so too can the data in a dynamic tabular view be narrowed by the selection of a cell containing a field value.

A search request is entered in a text box and the search is commenced by actuation of a push button control. The search request is submitted to a search engine which returns a list of hits. If the data disclosed by the search satisfies the user, the URL for the result may be sent to a report server to retrieve a report or a record.

To narrow the search, the user has the option of actuating a control to display a dynamic tabular view of the search results. The tabular view includes the controls described above by which the user can narrow the search request. That is, in response to the user's selection of cells containing values for fields in the displayed tabular data, the URL for the search result is supplemented with metadata containing the selected field-value pairs and a new search is executed.

The URL for each previous search is saved as a bread crumb for enabling the user to return to a previous set of search results.

After the dynamic table is rendered in the result page on the web browser, the user can switch back to standard view by submitting a request via a click on a button or link.

Figure 12:
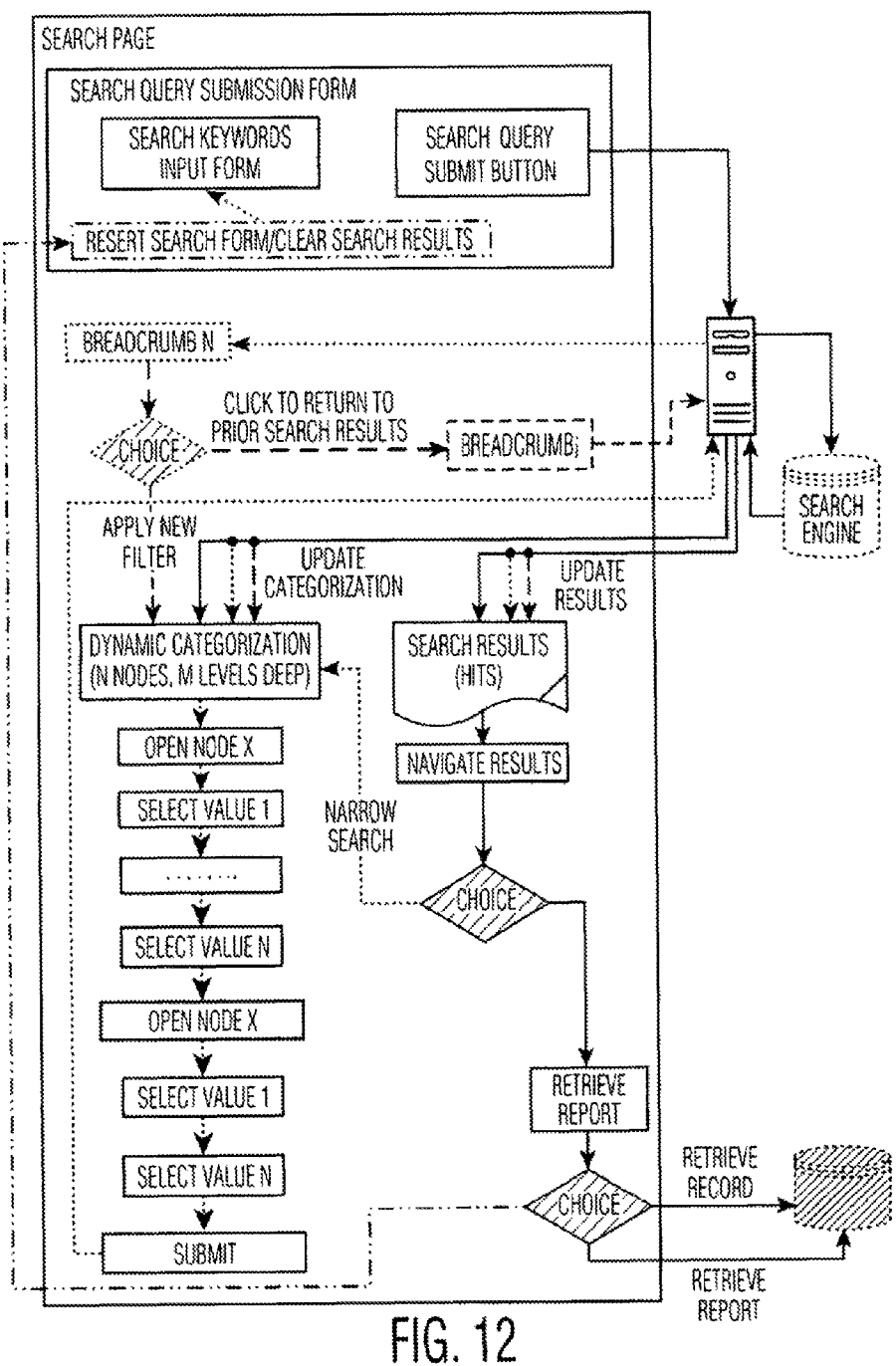
FIG. 12 is a block diagram showing, in detail, still a further step in the method in accordance with the preferred embodiment of the invention.

The use of a dynamic categorization of data, by means of a GUI control presented with search results in a standard view to filter the search results, is not limited to selection of a single tag-value pair each time an iteration of a search is performed. Referring to FIG. 12, there is shown a process similar to the one in FIG. 11, wherein the user may select multiple tag value pairs by opening more than one node and selecting a value for each opened node. In the preferred embodiment of the invention, the selected tag value pairs are logically combined in an "AND" statement that is appended to the URL for the last search result to derive a URL for a new search. The user can be provided with one more controls or other input fields or devices to change the operation by which the selected tag value pairs are logically combined. For example, values within the same field, i.e., having the same tag, can be combined in an "OR" operation while values in different fields, i.e., having different tags, can be concatenated, i.e., combined in an "AND" operation.

Figure 13:
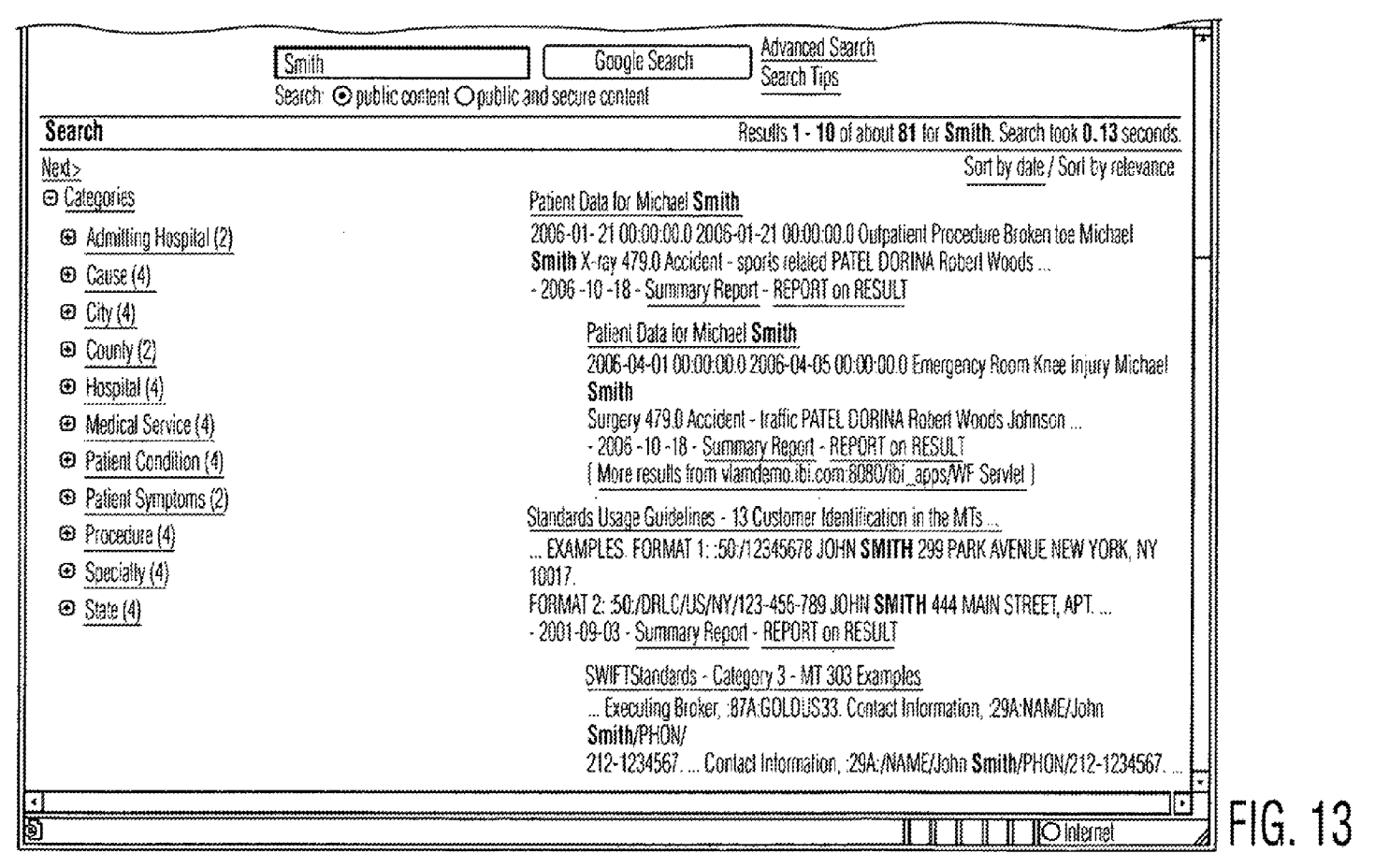

The number of values for each field or name in a search result need not be the same. In FIG. 13, the results of a search for the name "Smith" conducted on the accident database pertaining to table 1 above are shown. A URL for the search result appears in the "Address" window of the search engine. The number of hits is indicated to be "about 81".

A GUI control in the form of a tree has been constructed from the URL for the search result. From the tree, which appears to the left of the snippits corresponding to the hits, it is seen that of the approximately 81 hits returned for the search, no category appears in more than 4 of the 81 hits.

The first category, "Admitting Hospital", has the number "2" next to it which indicates that 2 of the 81 hits are tagged with the category "Admitting Hospital". If "Admitting Hospital" is selected, e.g., by clicking on it with a mouse, a meta search is performed in which all of the values of "Admitting Hospital" which collectively appear in the metadata for the 81 hits are listed beneath it.

Figure 14:
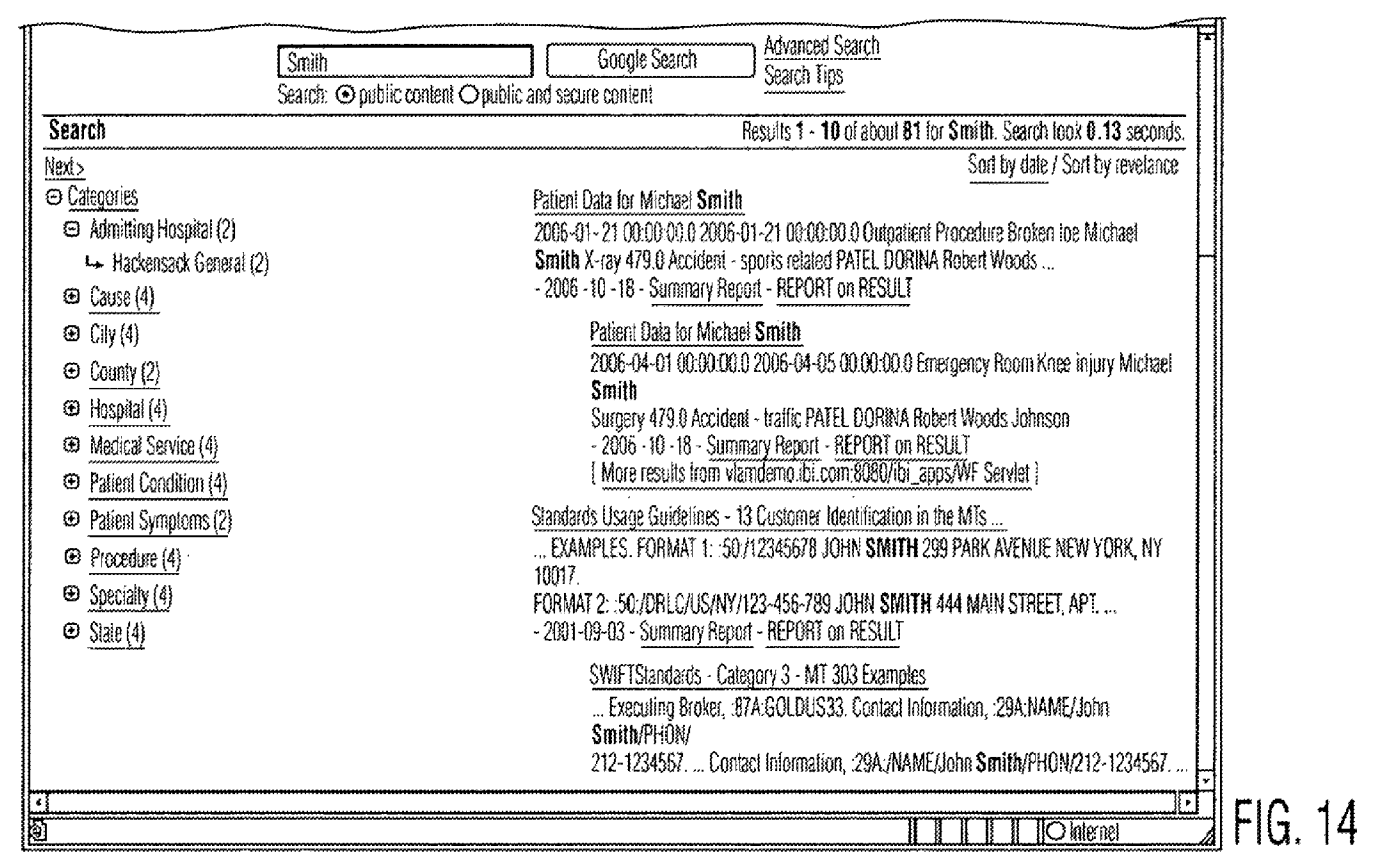

Referring now to FIG. 14, it is seen that there is only one admitting hospital named among the 81 hits, i.e., "Hackensack General". The number "2" next "Hackensack General" indicates that the value "Hackensack General" for the tag "Admitting Hospital" appears in 2 of the 81 hits.

If "Hackensack General" is selected, e.g., by clicking on it with a mouse, the previous search request is narrowed by appending the restriction, Admitting Hospital="Hackensack General", to the URL for the search result and a new search is executed.

Figure 15:
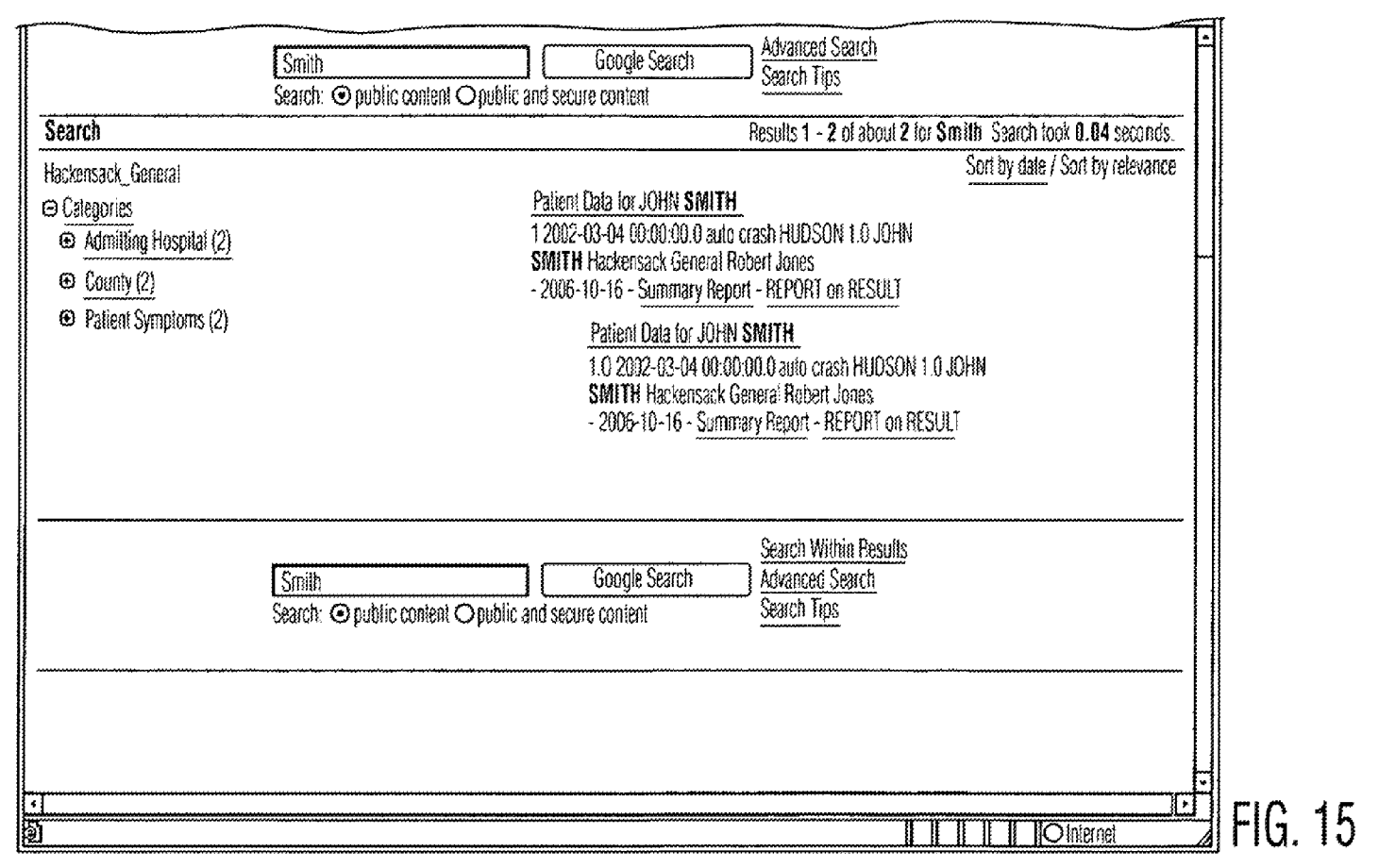

When the new search result is displayed, only the hits in which the tag "Admitting Hospital" has been matched with the name "Hackensack General" appear in the accompanying snippits. All hits which do not contain the tag "Admitting Hospital" and the value for it of "Hackensack General" have been eliminated from the display. This includes all of the hits which contain no metadata. Hence the search has been narrowed to only 2 hits as can be seen in FIG. 15.

Since search engines only display a few lines of output it is likely that the user would not have seen all of the information in the original 81 results records. However, the GUI control, in this case a tree, has identified all of the relevant hits, including those that are not shown on the initial screen.

In this way the user was able to winnow down the search in a guided manner until only the few hits of interest were displayed. The process of using the GUI control to select values appearing in the hits could be continued until the number of hits is one, and a particular record is found.

The user can, at any time, elect to use an option that appears beneath each hit. These options generally result in a display of information. In the example shown, there are two options, VIEW RESULT, and REPORT on RESULT.

The first option displays the information in the original record that the search engine indexed. The second option goes to the storage device and storage system where the original indexed structured data resides, for example, to a program that can query a relational database.

The selection of one of the foregoing options is passed to a control program which prepares a URL to be sent to a program on the reporting server. The first process that the control program performs is to identify which tags had data in the original search term or phrase that caused the selected hit to appear.

In the foregoing example a search was done on "Smith". In the records (hits) that were returned, "John Smith" was a data value for the tag, NAME_OF_INJURED01. The tag-value pair, NAME_OF_INJURED01, "John Smith", is sent to the control program. Also sent to the control program is each tag-value pair that the user selected during iterative use of the GUI control, i.e., the tree. In this case HOSPITAL "Hackensack General" is also returned to the Control program. If more than one tag contains the original search term both are passed to the Control program to be OR'ed together. The Control program now has:

NAME_OF_INJURED01 John Smith
HOSPITAL Hackensack General

This information is passed to the Report Server program to formulate a database query in which the selected values are used in a filter to be applied to the database for generating a report. The report is formatted and then returned to the user, or the report server program can request the user to provide more information for use in preparing a meaningful report. For example, a report server program might ask the user for the time period during which an accident took place.

It will be recalled that in the searching stage, each selection of a value for a tag on the tree or other GUI control resulted in a further restriction being appended to the search URL, and fewer hits in the next iteration of the search. This is not necessarily the case when the search engine returns fewer than all of the pages or records which satisfy the search request. For example, as previously noted, the Google search appliance may limit the number of hits to approximately 1000 even though more records or pages in the index satisfy the search request. As the search request is refined is further restricted by the addition of further tag-value pairs, snippets of pages or records previously excluded by the numerical page/record limitation may appear in the list of hits.

During report generation, a query constructed from the user's selection of values in the GUI control may be applied to a data source broader than the original one. That is, the data source to which the original search was directed may be a relational database that can be joined with one or more external databases through a common field. The external databases may contain records with additional instances of the tag-value pairs that were selected in the original database. The end result would be a report from a compound database that could contain more information than was originally indexed, but which always uses the values obtained from the dynamically constructed trees or other GUI controls.

Although a preferred embodiment of the present invention has been described for illustrative purposes, those skilled in the art will appreciate that various modifications, additions and substitutions are possible, without departing from the scope and spirit of the invention which is described in the following claims.

What is claimed is:

1. A method of producing, on a user computer, a browser readable computer file including a dynamic report presenting the results of a query transmitted over a network to a structured database, said structured database having a plurality of data, comprising:
   generating on a server computer, to which said user computer is connected over a network, a single browser readable computer file containing no other computer files for receiving said results of said query,
   passing to said single browser readable computer file an analytic/interactive software engine comprising a computer program executable in a browser on any computer on which the browser is operable,
   passing data comprising said results of said query to said single browser readable computer file wherein said data comprising said results of said query and the analytic/interactive software engine reside in the same file, saving said single browser readable computer file on said user computer, disconnecting said user computer from said network, and executing said computer program in said analytic/interactive engine on said user computer for manipulating said data comprising said results of said query while disconnected from said network, wherein said manipulating comprises one or more of the following, performing a calculation on the data comprising said results of said query in one view the result of which is displayed in another view, performing a calculation on the data comprising said results of said query in one view the result of which is displayed in another view as a sum of data displayed in said one view, pivoting said data comprising said results of said query in the rows and columns of a table displayed in one view for display in another view, filtering the data displayed in one view for display in another view of a subset of the data in said one view, rolling up the data displayed in one view for display in another view of a subset of the rows of data in said one view, nesting a subarray of the data displayed in one view in the display of data in another view, and/or providing a control in one view which when actuated presents the data as scrolling in another view.

2. The method of producing a browser readable computer file including a dynamic report according to claim 1 wherein said manipulating sorts the data comprising said results of said query in one view for display in another view.

3. The method of producing a browser readable computer file including a dynamic report according to claim 1 further comprising passing to said file, over said network, a style sheet, and said manipulating formats the data displayed in one view for display in another view in a font, style or color different from the font, style or color in which said data is displayed in said one view.

4. The method of producing a browser readable computer file including a dynamic report according to claim 1 further comprising providing a control in one view which when actuated emails a copy of said file to another user.

5. The method of producing a browser readable computer file including a dynamic report according to claim 1 further comprising providing a control in one view which when actuated exports a copy of said file to an external computer program.

6. A method of enabling a user to manage, on a user computer, a dynamic report of the contents of an answer set of records received over a network by querying a database for matches between a search criterion and a key word search index of a population of records, after being disconnected from said network, comprising:

modifying each one of said records with metadata comprising the name of a tag and at least one value of said tag, each said name of a tag and each said corresponding value forming a tag-value pair, whereby said name of a tag and said at least one value of said tag are added to and made part of the content of said record, performing a key word search by comparing the content of the index with said search criterion, obtaining an answer set of records satisfying said search criterion, generating on a server computer, to which said user computer is connected over said network, a single computer readable file, containing no other computer files, which can be displayed in a browser, said file including a dynamic report of data which is a function of said answer set of records, and an analytic/interactive engine comprising a computer program executable for manipulating said data while disconnected from said network without need for any application external to said analytic/interactive engine other than said browser, wherein said manipulating comprises one or more of the following, performing a calculation on the data comprising said results of said query in one view the result of which is displayed in another view, performing a calculation on the data comprising said results of said query in one view the result of which is displayed in another view as a sum of data displayed in said one view, pivoting said data comprising said results of said query in the rows and columns of a table displayed in one view for display in another view, filtering the data displayed in one view for display in another view of a subset of the data in said one view, rolling up the data displayed in one view for display in another view of a subset of the rows of data in said one view, nesting a subarray of the data displayed in one view in the display of data in another view, and/or providing a control in one view which when actuated presents the data as scrolling in another view, and saving said single computer readable file on said user computer.

7. The method according to claim 6 further comprising:

executing instructions in said analytic/interactive engine on said data for rendering one view of said tag-value pairs in a table with the tags shown as field names in said table and a value for each tag listed in a cell within said table, and displaying at least one control actuable by a user for transforming the display of said data into another view.

8. The method according to claim 6 further comprising generating a URL for each answer set of records, adding to said URL the identity of an external set of records not included in said answer set of records, and operating said analytic/interactive engine on said data which is a function of said answer set of records and data which is a function of said external set of records for including in said dynamic report information not contained in said answer set of records.

9. The method according to claim 6 further comprising displaying for each record in said answer set at least one link to a corresponding meta query, causing said analytic/interactive engine to apply at least one of said meta queries to an external database by actuating its respective link, and preparing a dynamic report which is a function of the contents of the records in said external database returned by said at least one of said meta queries.

* * * * *